United States Patent
Bakalash

(10) Patent No.: US 11,712,620 B2
(45) Date of Patent: Aug. 1, 2023

(54) RELOCATABLE LOCATION-BASED GAMIFIED APPLICATIONS

(71) Applicant: Reuven Bakalash, Shdema (IL)

(72) Inventor: Reuven Bakalash, Shdema (IL)

( * ) Notice: Subject to any disclaimer, the term of this patent is extended or adjusted under 35 U.S.C. 154(b) by 0 days.

(21) Appl. No.: 17/722,920

(22) Filed: Apr. 18, 2022

(65) Prior Publication Data

US 2023/0146131 A1 May 11, 2023

Related U.S. Application Data

(60) Provisional application No. 63/277,170, filed on Nov. 9, 2021.

(51) Int. Cl.
| | |
|---|---|
| *G06T 19/00* | (2011.01) |
| *G06F 3/01* | (2006.01) |
| *H04L 29/06* | (2006.01) |
| *A63F 13/216* | (2014.01) |
| *A63F 13/63* | (2014.01) |
| *A63F 13/65* | (2014.01) |

(52) U.S. Cl.
CPC ............ *A63F 13/216* (2014.09); *A63F 13/63* (2014.09); *A63F 13/65* (2014.09); *A63F 2300/205* (2013.01); *A63F 2300/6018* (2013.01); *A63F 2300/69* (2013.01)

(58) Field of Classification Search
CPC ........ A63F 13/216; A63F 13/47; A63F 13/63; A63F 13/65; A63F 2300/8082; H04L 67/131; H04L 67/34; G06F 3/011; G06T 19/006; G06T 2210/61
See application file for complete search history.

(56) References Cited

U.S. PATENT DOCUMENTS

| | | |
|---|---|---|
| 10,010,790 B2 | 7/2018 | Hazucha |
| 10,507,387 B2 | 12/2019 | Sen et al. |
| 10,569,176 B2 | 2/2020 | Otte |

(Continued)

OTHER PUBLICATIONS

André Melzer, Lia Hadley, Thomas Winkler, and Michael Herczeg: Developing, implementing, and testing mixed reality and high interaction media applications in schools.

(Continued)

*Primary Examiner* — Lawrence S Galka
(74) *Attorney, Agent, or Firm* — Mark David Torche; Patwrite Law

(57) ABSTRACT

A modular system for creating a location-based gamified application configured to be played by one or more player units on a playground, uses a location-based mobile game application configured to track and supervise the creation of the location-based gamified application. A gaming content module is configured to store a plurality of contents of different media required for creation of the gamified application. A database storing a plurality of customization and relocation tools, is provided wherein the tools are organized in a plurality of hierarchical templates. Tools include a Generic Gaming Core template for creating a basic skeleton of the gamified application, a Setup Design template for incorporating a relocation component into the Generic Gaming Core corresponding to a specific location and environment, and a User Customization template for enhancing the gamified application experience.

35 Claims, 16 Drawing Sheets

(56) References Cited

U.S. PATENT DOCUMENTS

| | | |
|---|---|---|
| 10,713,845 B2 | 7/2020 | Albertson et al. |
| 10,737,176 B2 | 8/2020 | Schacher et al. |
| 10,789,749 B2 | 9/2020 | Tajima |
| 2002/0010734 A1 | 1/2002 | Ebersole et al. |
| 2003/0050105 A1 | 3/2003 | Okamura et al. |
| 2011/0244964 A1 | 10/2011 | Glynne-Jones et al. |
| 2017/0034470 A1 | 2/2017 | Kleinrock et al. |
| 2017/0043244 A1 | 2/2017 | Briggs |
| 2017/0061704 A1 | 3/2017 | Gewicke et al. |
| 2018/0021671 A1 | 1/2018 | Liesenfelt |
| 2018/0124148 A1 | 5/2018 | Boudville |
| 2019/0043264 A1* | 2/2019 | Tomizuka ............. H04L 67/131 |
| 2019/0217195 A1 | 7/2019 | Yim |
| 2020/0241733 A1 | 7/2020 | Drake et al. |
| 2020/0258419 A1 | 8/2020 | Lee et al. |
| 2020/0364937 A1* | 11/2020 | Selbrede ............... G06F 16/587 |

OTHER PUBLICATIONS

Staffan Björk, Johan Peitz: Understanding Pervasive Games through Gameplay Design Patterns.
António Coelho et al.: Serious pervasive games. Front. Comput. Sci., Aug. 31, 2020.
Nikolaos Avouris, Nikoleta Yiannoutsou: A Review of Mobile Location-based Games for Learning across Physical and Virtual Spaces. Journal of Universal Computer Science. 18.
Dr. Thomas Dreher: Conceptual Art and Intermedia Art, Creative Commons Atribution-NonCommercial-NoDerivs 2.0, (German Version Apr. 2008), Oct. 2008.

* cited by examiner

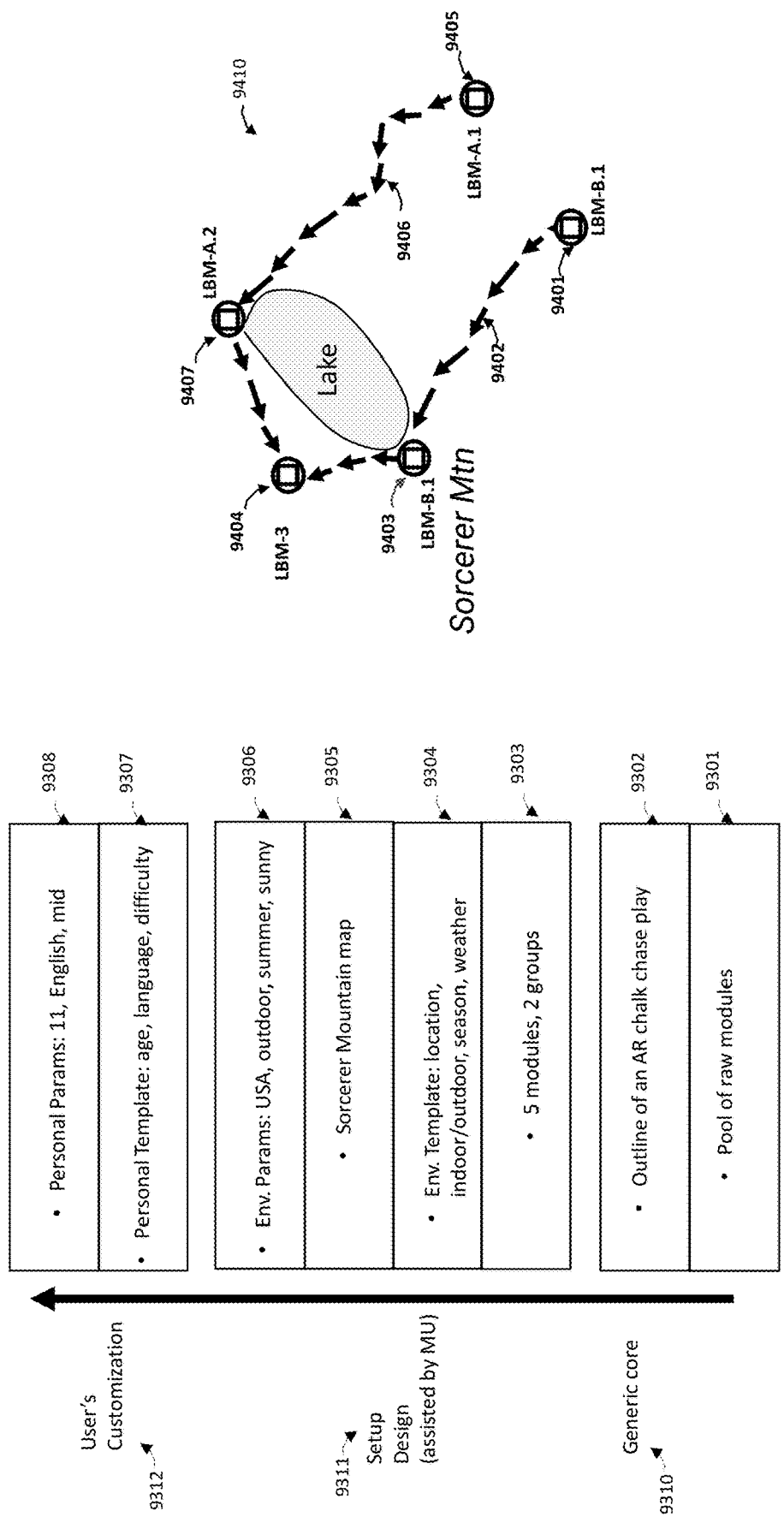

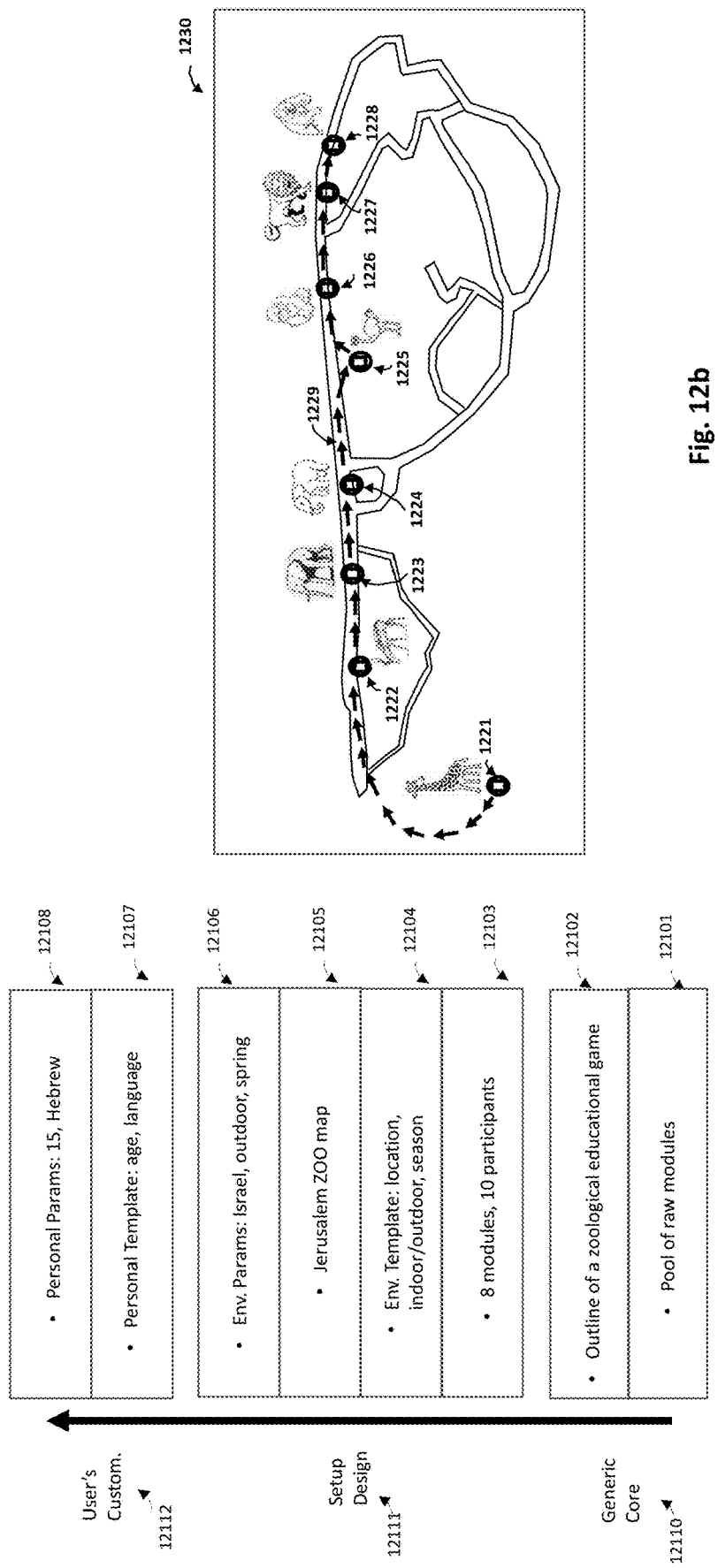

RELOCATABLE LOCATION-BASED GAMIFIED APPLICATIONS

CROSS-REFERENCE TO RELATED CASES

The present application claims priority based on U.S. Provisional Application No. 63/277,170 filed Nov. 9, 2021, entitled: "Digital Chalk Marks", incorporated hereby by reference.

FIELD OF THE INVENTION

The disclosure herein relates to location-based games and gamified applications. In particular, the disclosure relates to fast and efficient build and relocation of location-based games and gamified applications played with mobile devices.

BACKGROUND

Gamification is a technology that incorporates elements of a game play in nongame situations. It is used to engage customers, students, and users in the accomplishment of quotidian tasks with rewards and other motivators. Gamification is the use of game design elements in non-game contexts, such as educational, touristic and other. The use of educational games as learning tools is a promising approach due to their abilities to teach and reinforce not only knowledge but also important skills such as problem solving, collaboration, and communication. Games have remarkable motivational power; they utilize several mechanisms to encourage people to engage with them, often without any reward, just for the joy of playing and possibility to win. As opposed to using elaborate games requiring a large amount of design and development efforts, the "gamification" approach suggests using game thinking and game design elements to improve learners' engagement and motivation.

In location-based gamification applications and games, the gameplay evolves and progresses via a player's location. It is a type of pervasive games where the gaming experience is extended out in the real world, or where the fictive world in which the game takes place blends with the physical world. Location-based gamification applications and games are played in the real location of interest and can be reinforced by multimedia elements such as videos or still images, XR, sound effects, music, narration, and text. It is distinguished from a video game which does not take place in the real location but is based on a virtual location, video of location, photographic-based media, or simulation of the location of interest.

Location-based gamification and games must provide some mechanism to allow the player to report their location. Generally this is through some kind of localization technology, such as satellite positioning through GPS. Various mobile devices, such as smartphones, can be used to provide a player's mobility. Gamification has become a hot topic in the area of location-based mobile applications.

Mobility of the player is an important factor in playing location-based mobile games. It refers to the tools the player is given to play while he can freely move about from place to place, indoor or outdoor. This can go from simple actions (e.g., running and jumping) all the way to more complex ones traversing wide outdoor areas (driving, climbing, swinging, rolling, hunting, grappling and so on). The player must be continuously connected via his hand-held devices (such as smartphones, tablets, etc.) to data storage and to computing power of a cloud, via Internet. Cloud gaming is an online gaming application running on a user's smartphone. The player's mobility can be combined with diverse cloud gaming to allow playing video games on the move, going from a simple single-player game to more computationally demanding multiplayer games enabling to join a players' session by a viewer that can affect or take control over the game.

The player mobility can be naturally brought together with augmented reality (AR). AR is an interactive experience of a real-world environment where the objects that reside in the real world are enhanced by computer-generated perceptual information, sometimes across multiple sensory modalities, including visual, auditory, haptic, somatosensory and olfactory. AR incorporates three basic features: a combination of real and virtual worlds, real-time interaction, and accurate 3D registration of virtual and real objects. The superset of AR is extended reality (XR), a term referring to all real-and-virtual combined environments and human-machine interactions generated by computer technology and wearables, where the 'X' represents a variable for any current or future spatial computing technologies. XR is a rapid growing field being applied in a wide range of ways, such as entertainment, marketing, real-estate, education, training, and remote work.

Modular design of a game subdivides a game into smaller parts called modules, which can be independently created, modified, replaced, or exchanged with other modules or between different games. A modular design can be characterized by functional partitioning into discrete scalable and reusable modular components. Modular design inherently combines the advantages of scalability with those of customization. The degree of modularity determines the degree of customization possible. The same module can be repeatably customized for different players, different contents, and different environments.

Modularity offers benefits such as reduction in cost (customization can be limited to a portion of the system, rather than needing an overhaul of the entire system), interoperability, shorter learning time, flexibility in design, non-generationally constrained augmentation or updating (adding new solution by merely plugging in a new module). Modularity in physical gaming offer benefits in reduced product development cost, and time to market.

Lack of game-relocation capability. A location-based gamification application or game, by definition, is designed to be played at a specific location, limiting its mobility. An enhanced gaming experience achieved by customization to the user (by age, gender, language, difficulty level, etc.), even farther restrains the game mobility. Conventionally, a location-based gamified application or game must be created specifically for the location of interest, in contrast, for example, to a video game which can be played everywhere. Therefore, there is a great need for a novel method to relocate effectively and easily the location-based gamification applications and games to various sites and users.

SUMMARY

Embodiments are directed toward fast and efficient build and relocation of location-based games and location-based gamified applications played with mobile devices, remotely from a cloud. The use of templates and modularization techniques enable location-based games to be played at diverse locations, specifically adapted to the gaming site, physical environment, and players. The relocation and customization are done in an easy, fast, and effective way. This contradicts with the prior art where designing of the location-based games or gamified applications for a specific location, limits their mobility.

The relocation competence of the embodiments of the present invention is based on the customization and relocation tools, using templates, parameters, and modules. The tools are organized in three hierarchical levels: a basic level which is a Generic Core, a second level which is a Setup Design, and a third level which is User's Customization. The Generic Core is the starting point of a game creation, holding its basic skeleton, and a rich library of raw modules. This core undergoes a relocation by the Setup Design level, into specific location and environment, and further by the User's Customization level for an enhanced gaming experience. The relocation and customization are an easy and fast process: the Setup Design can be done in an interactive time by game administrator, while the User Customization is done automatically as part of the game.

During the customization procedure, the raw modules of the Generic Core are transformed into gaming segments of the game, termed location-based modules (LBM), scattered throughout the playgrounds. They are visible to the player as augmented reality objects. The LBM plays a triple role: as a gaming segment (communicating the gaming contents and interacting with the player), as a customization agent (collecting user's parameters), and as an administration agent (communicating, synchronizing, interfacing, and coordinating between the player, the cloud and optionally a monitoring unit.). On the playground, the scattered LBMs are interconnected by augmented reality chalk marks (ARCM) forming the overall gameplay structure.

The relocation capability and modularity of a game offers benefits such as reduction in cost (customization can be limited to a portion of the system, rather than needing an overhaul of the entire system), interoperability, shorter learning time, flexibility in design, easy augmentation or updating (adding new solution by merely plugging in a new or newly customized module), reduced product development cost and time to market, and extended global markets. The modular design inherently combines the advantages of scalability (e.g. arbitrary number of modules in a game, increasing the size of a game, the number of topics in a game, and number of players) with those of customization (enhancing the gamer's experience and expanding the game's target audiences), and flexibility.

BRIEF DESCRIPTION OF THE DRAWINGS

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the several selected embodiments may be put into practice.

As used in this specification, the singular indefinite articles "a", "an", and the definite article "the" should be considered to include or otherwise cover both single and plural referents unless the content clearly dictates otherwise. In other words, these articles are applicable to one or more referents. As used in this specification, the term "or" is generally employed to include or otherwise cover "and/or" unless the content clearly dictates otherwise.

Figure 1:
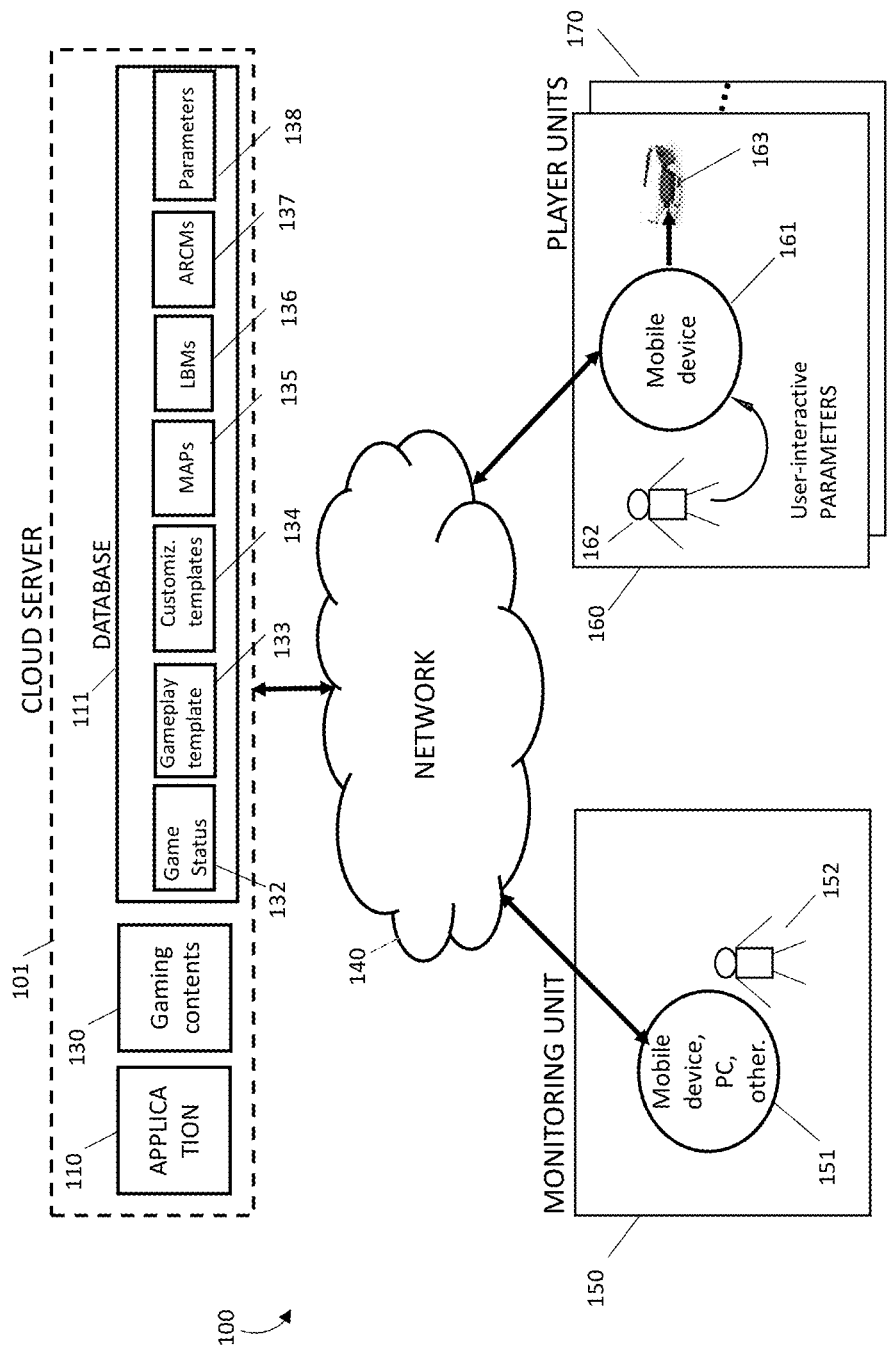
Figure 2:
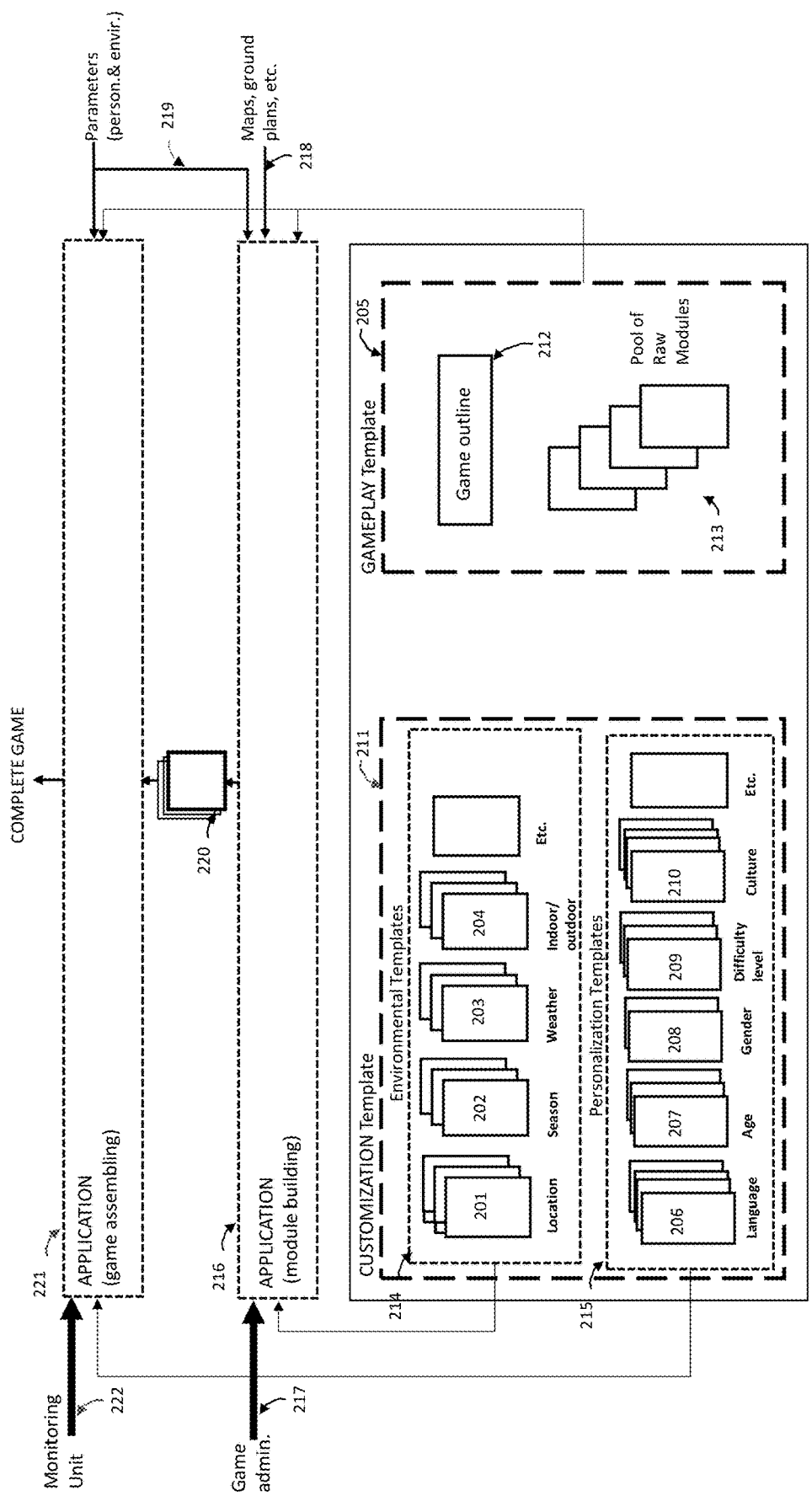
Figure 3:
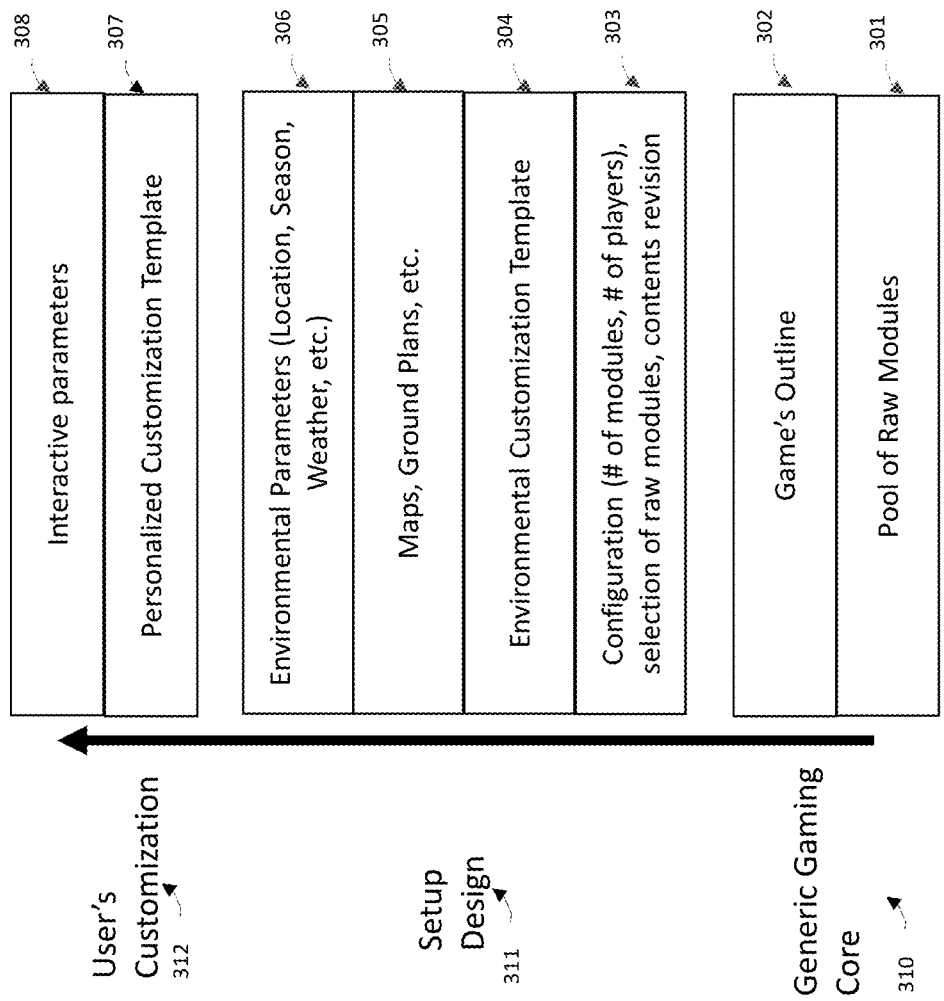
Figure 4:
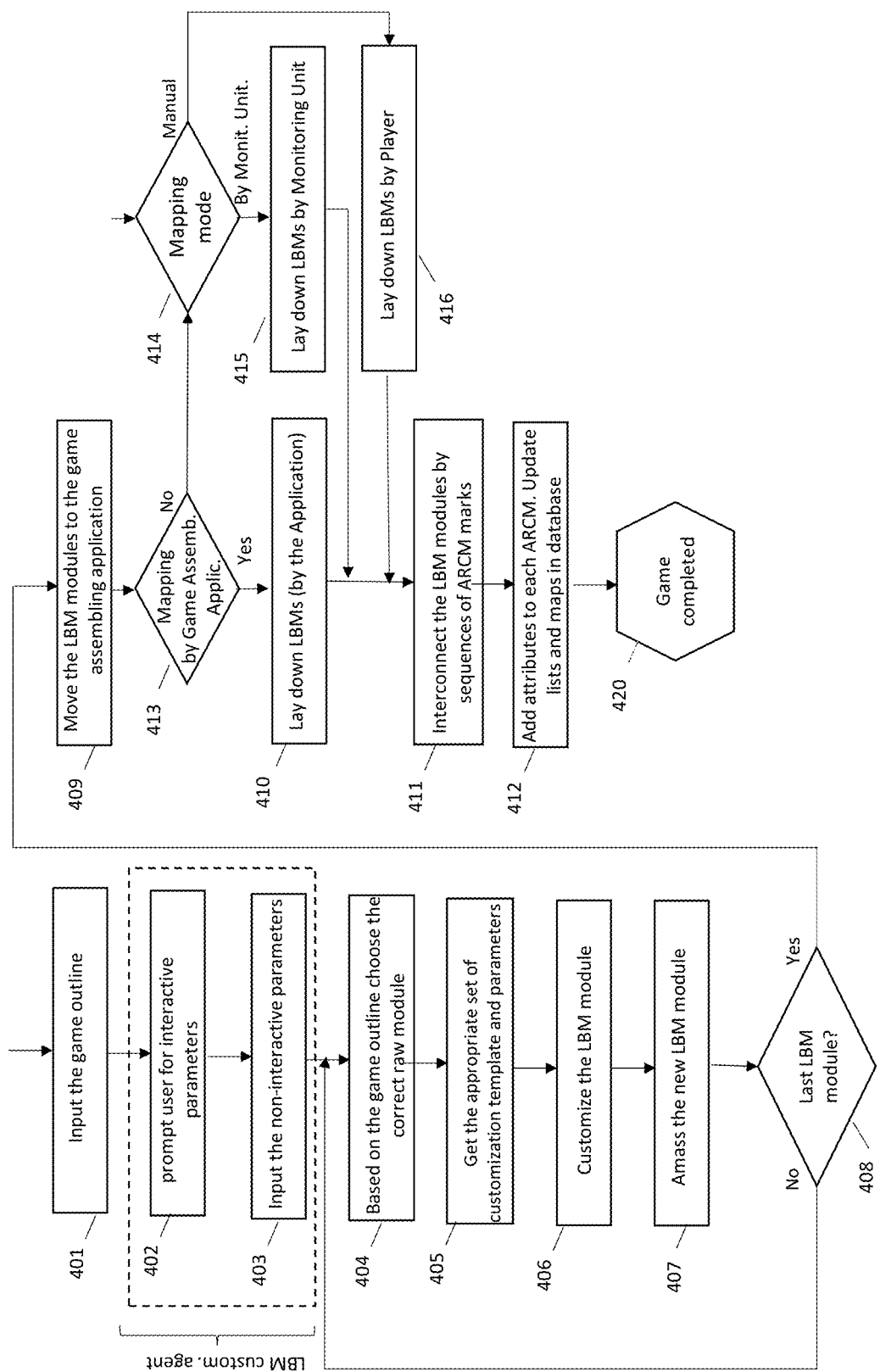
Figure 5A:
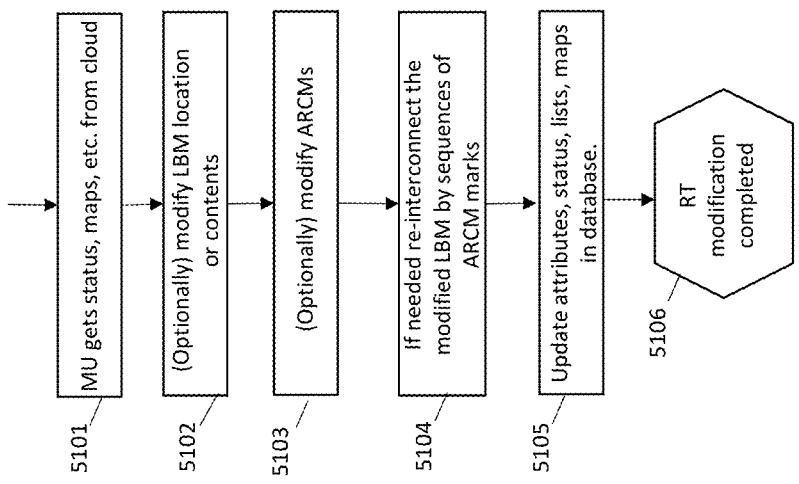
Figure 5B:
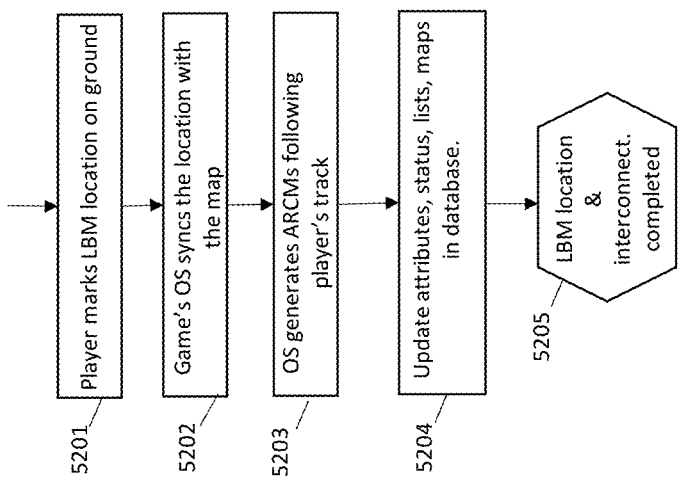
Figure 6:
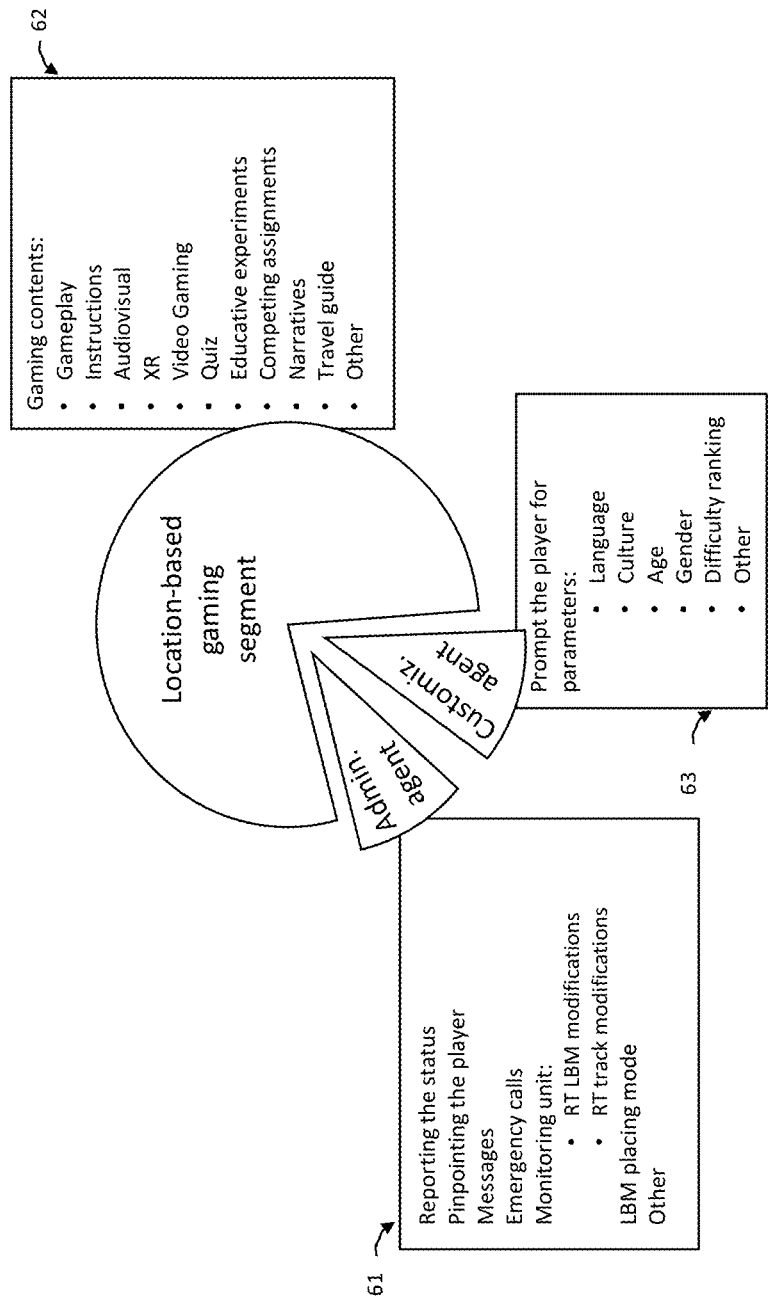
Figure 7B:
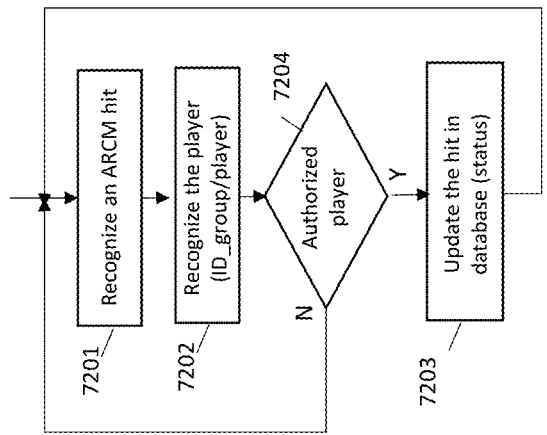
Figure 7A:
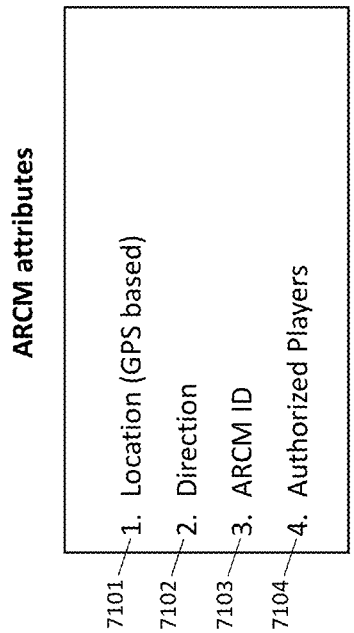
Figure 8:
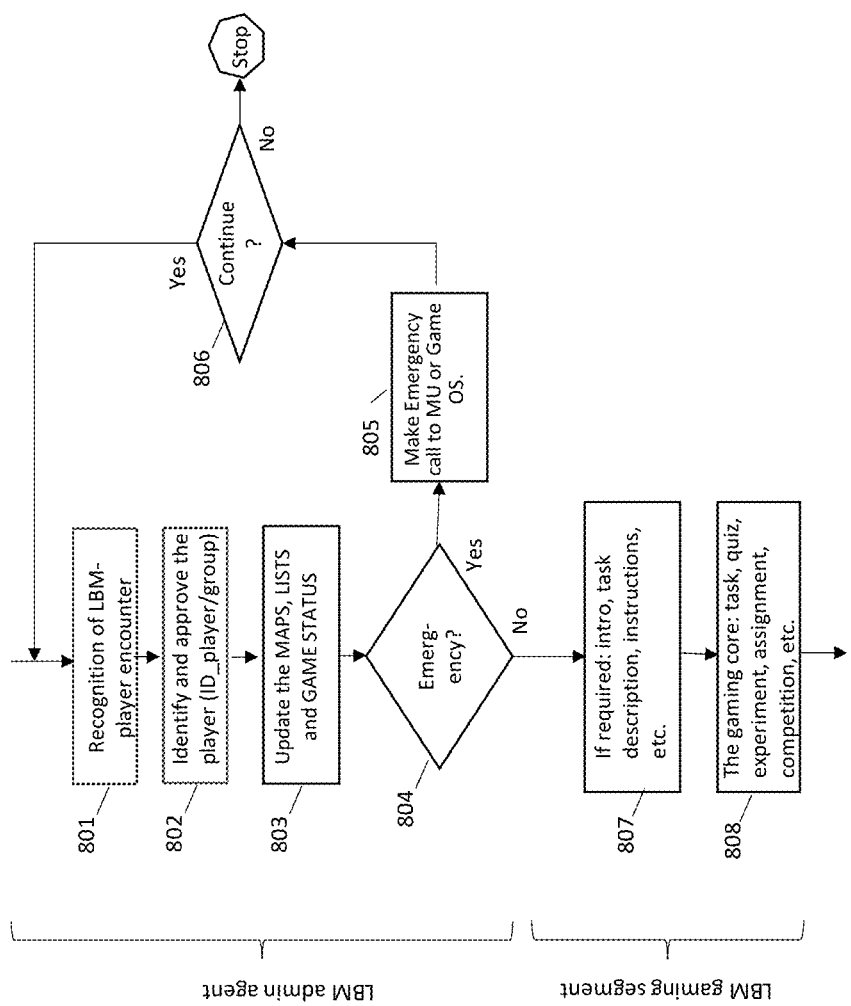
Figure 9B:
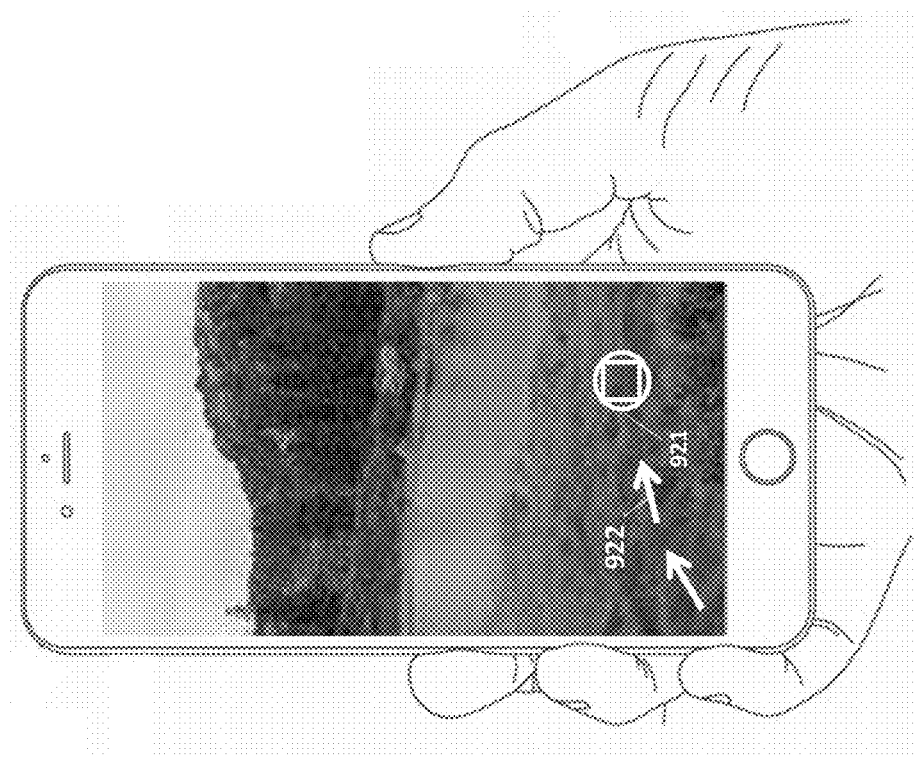
Figure 9A:
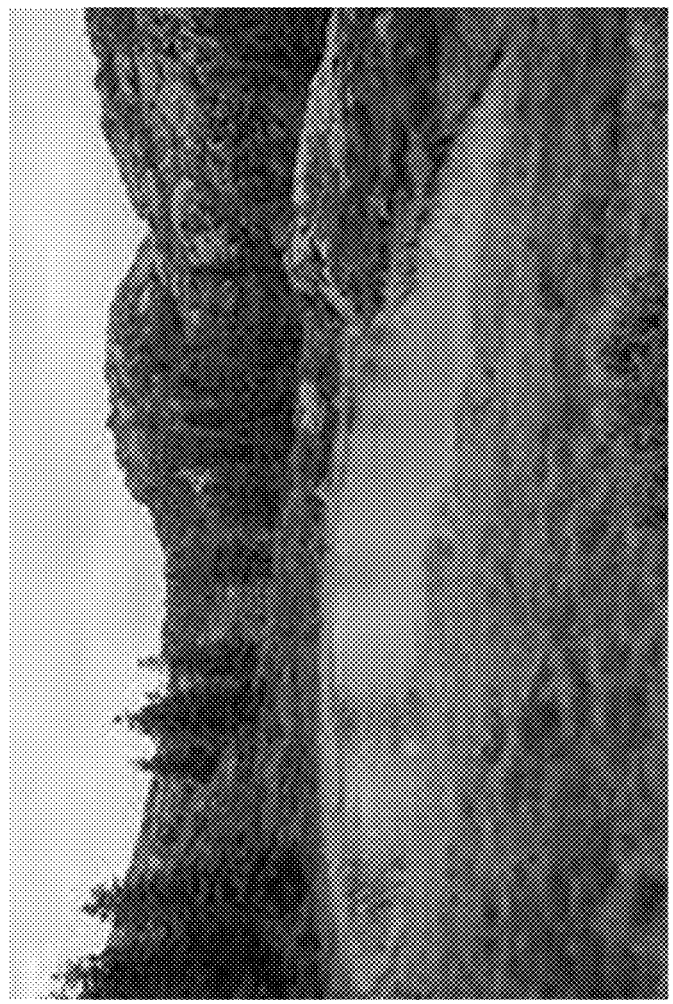
Figures 10A, 10B:
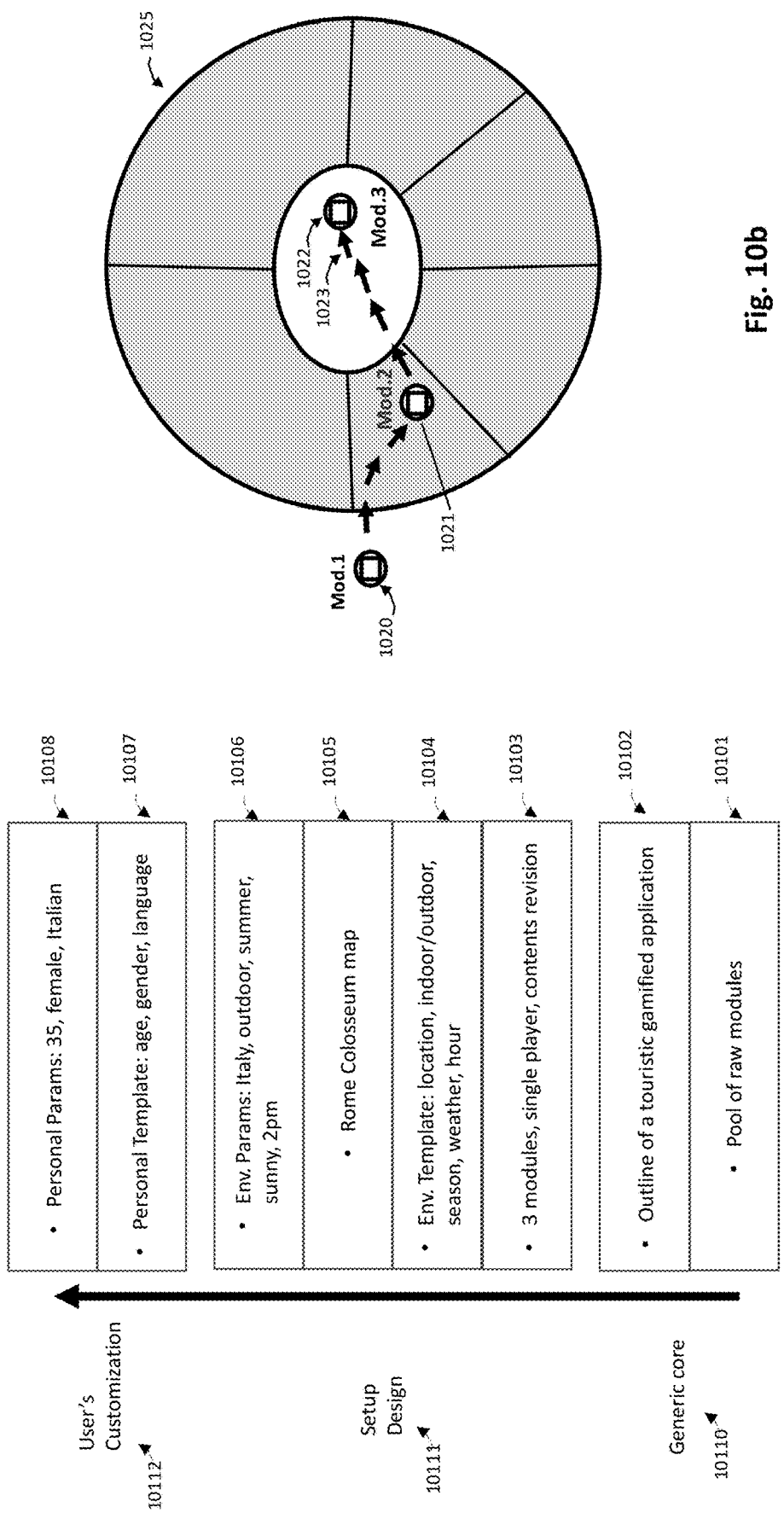
Figure 11B:
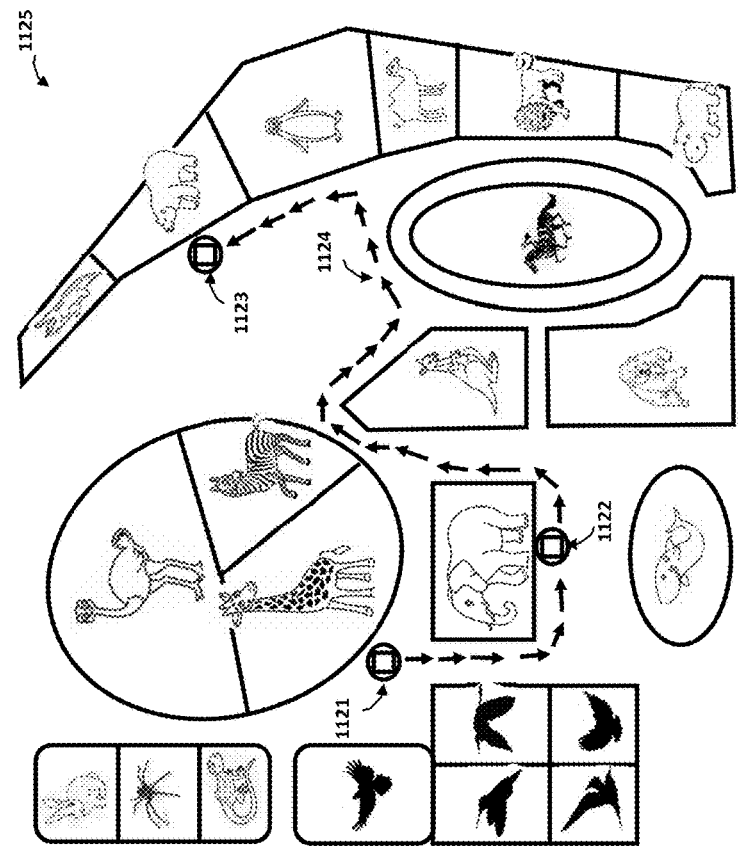
Figure 11A:
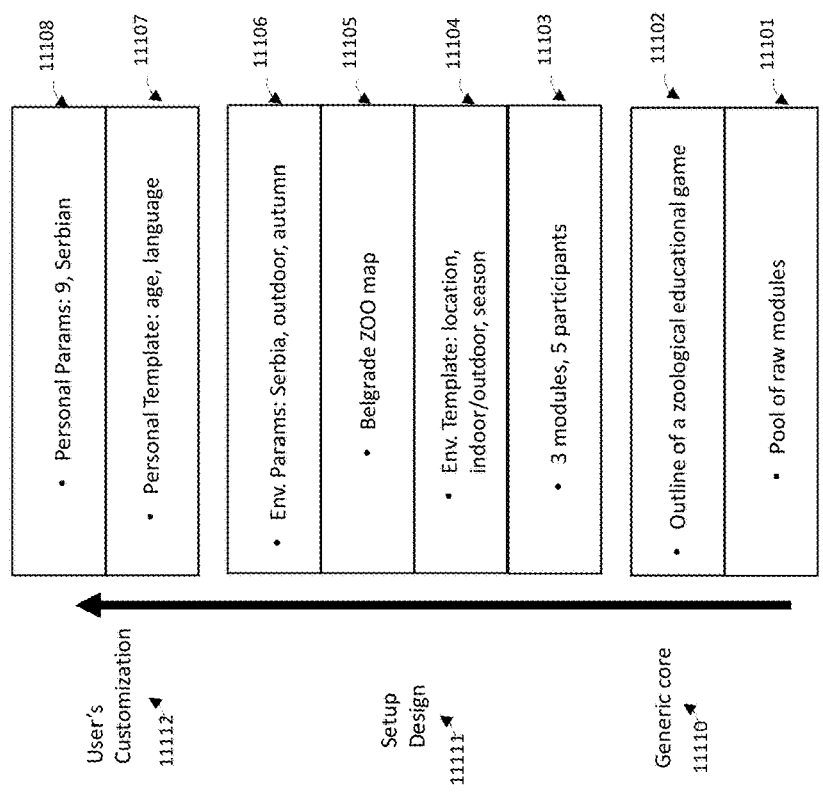
Figure 13B:
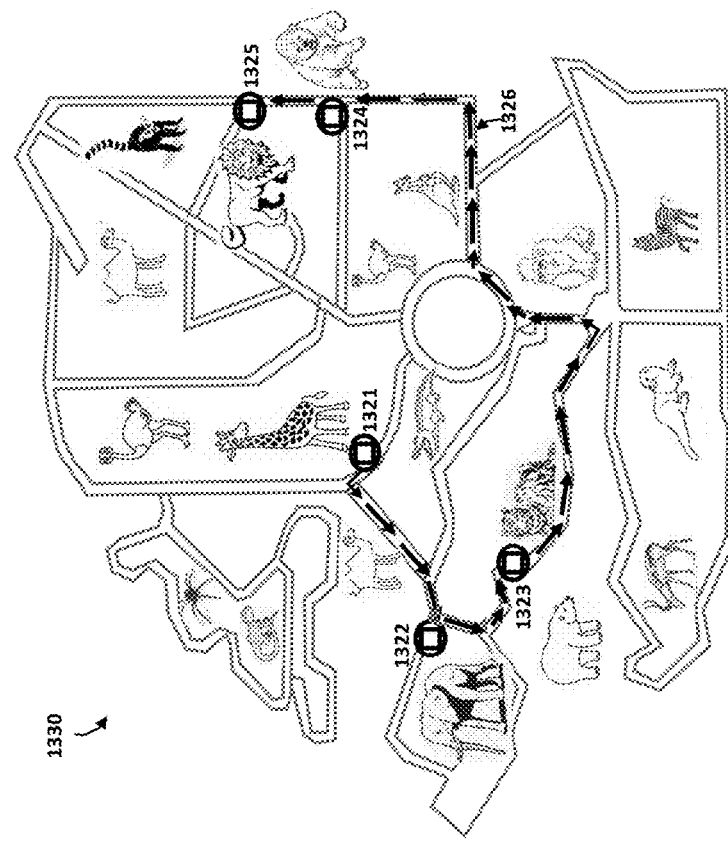
Figure 13A:
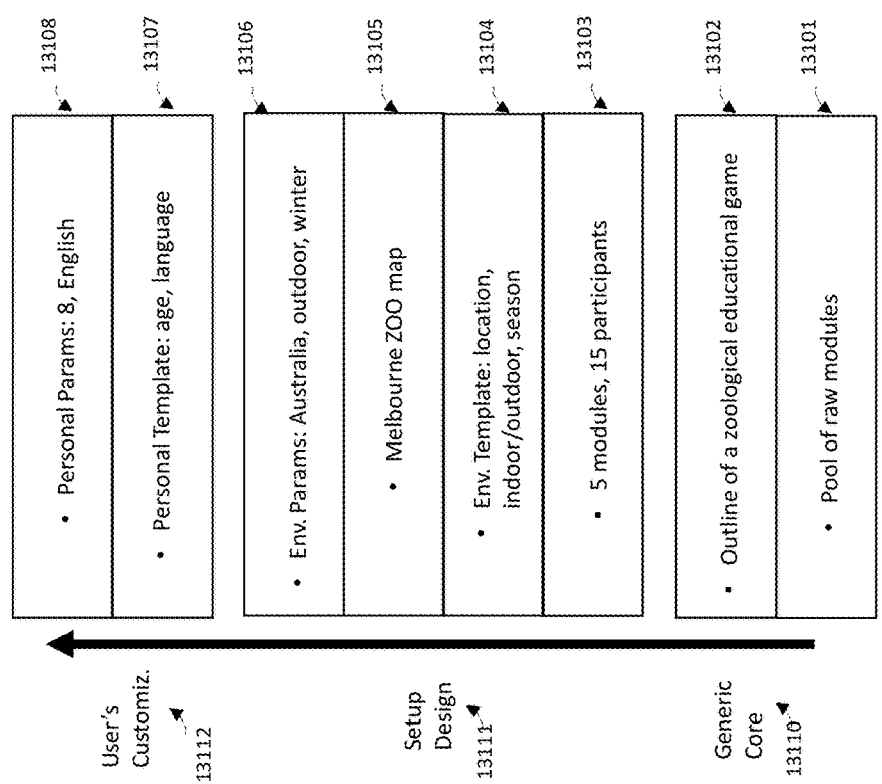

In the accompanying drawings:

FIG. 1. Illustrates a schematic representation of a network-based mobile gaming system in accordance with an exemplary embodiment of a present invention;

FIG. 2 illustrates a methodology of creating a game using the templates in accordance with an exemplary embodiment of a present invention;

FIG. 3 illustrates a hierarchical structure of relocation and customization tools;

FIG. 4 illustrates a flowchart for the generation of a complete location-based modular game in accordance with an exemplary embodiment of a present invention;

FIG. 5a illustrates a flowchart depicting a possible working of the monitoring unit (MU), according to the needs arise during multiplayer/multigroup games in accordance with an aspect of the present invention;

FIG. 5b illustrates a flowchart showing manual LBM mapping by a player;

FIG. 6 illustrates the structure of a location-based module;

FIG. 7a illustrates the attributes of an AR chalk mark (ARCM);

FIG. 7b illustrates a method of handling the ARCM hit by a player;

FIG. 8 illustrates a method of handling the LBM hit by a player;

FIG. 9a illustrates an exemplary landscape of a playground;

FIG. 9b illustrates the exemplary playground of FIG. 9a on a player's mobile device with visible AR marks;

FIG. 9c illustrates customization and relocation tools used for a musical educational game in accordance with an exemplary embodiment of a present invention;

FIG. 9d illustrates a gaming map of the exemplary embodiment of FIG. 9c;

FIG. 10a illustrates customization and relocation tools used for a touristic gamified application in accordance with an exemplary embodiment of a present invention;

FIG. 10b illustrates a gaming map of the exemplary embodiment of FIG. 10a;

FIG. 11a illustrates customization and relocation tools used for a first use-case of a zoological educational game in accordance with an exemplary embodiment of a present invention;

FIG. 11b illustrates a gaming map of the exemplary embodiment of FIG. 11a;

FIG. 12a illustrates customization and relocation tools used for a second use-case of a zoological educational game in accordance with an exemplary embodiment of a present invention;

FIG. 12b illustrates a gaming map of the exemplary embodiment of FIG. 12a;

FIG. 13a illustrates customization and relocation tools used for a third use-case of a zoological educational game in accordance with an exemplary embodiment of a present invention;

FIG. 13b illustrates a gaming map of the exemplary embodiment of FIG. 13a; and

Figure 14:
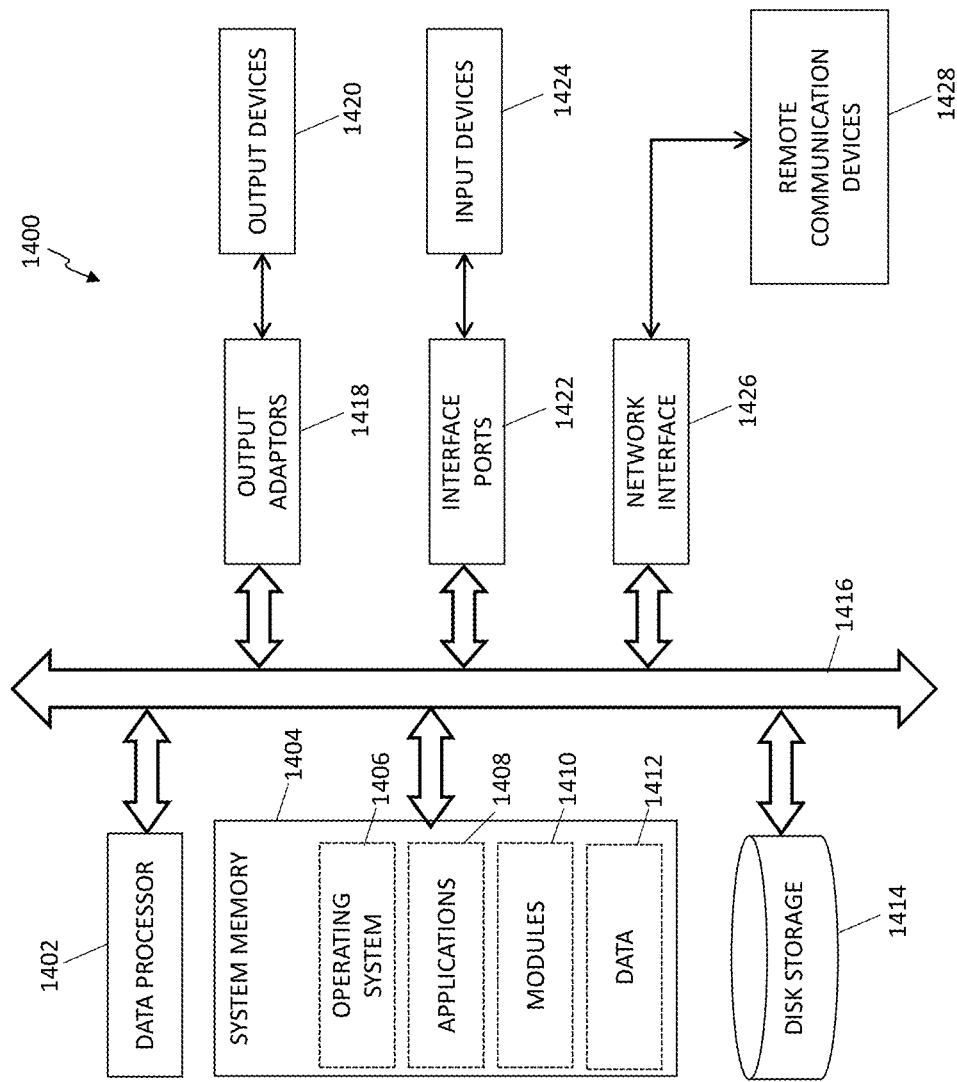

FIG. 14 illustrates a block diagram of an exemplary system for implementing various aspects of the invention.

DETAILED DESCRIPTION OF THE DISCLOSURE

Embodiments of the present invention are directed towards the ability to relocate the location-based games to diverse locations, physical environment, and players, while maintaining the game highly customized to location and user. A unique modular approach facilitates game relocation, full gamer's customization, and fast modification of gaming configurations and contents. In addition, a full player's mobility is gained by use of a handheld computing device continuously connected to cloud. The player's mobility naturally comes with augmented reality guiding marks.

The embodiments of the present invention are based on a modular design of the game. The game is subdivided into modules, which in their initial phase comprise a generic core of the game, referring to nonspecific locations, environment, and players. By applying a hierarchical structure of templates and parameters, a module is independently modified, customized, and assigned a specific location on the playground map, becoming a location-based module (LBM). The relocation and customization of the present invention is an easy and fast process, done in an interactive time.

The LBM has a triple role in the game. As a gaming segment (communicating the gaming contents and interacting with the player), as a customization agent (collecting user's parameters), and as an administration agent (communicating, synchronizing, interfacing, and coordinating between the player, the cloud and optionally the monitoring unit.). The scattered LBMs are interconnected by augmented reality chalk marks (ARCM), forming the overall gameplay structure. Alternatively, directions to the next LBM can be communicated by the current LBM, making the chalk marks redundant for this gameplay segment.

Embodiments of the present invention can be applied outdoor as well as indoor applications. Further, the method does not limit the playground size or the number of players. It facilitates great flexibility and adaptability to user's language, age and gender, number of users, game genres, gameplays, terrain topography and geography. The game range is unlimited, starting from a single player game based on a single LBM module, all the way to complex gameplays of multiple groups of players and multiple LBM modules, utilizing various visualization media and technologies.

In a particular embodiment, groups of players can play in a monitored mode while a monitoring unit (MU), connected to the cloud, supervises the game. A network-based communication takes place between the monitoring unit and the players, and mutually between the player groups. Another embodiment calls for an autonomous mode, when players can play autonomously without a monitoring supervision, inter-communicating through the network.

Reference is made to FIG. 1 which shows a schematic representation of the network-based gaming system 100, suitable for providing, tracking and playing location-based mobile games, indoor and outdoor, having modular mechanism according to embodiments of present invention. The interaction between a cloud server 101, a (optional) monitoring station 150 and player units 160, 170, etc., is enabled through a network 140. The network-based gaming system 100 includes an application 110, a database 111, and mobile devices 151 and 161, all communicatively coupled to each other via the network 140. The monitoring mobile device 151 can be replaced by a PC or alike due to low mobility requirement of the monitoring station 150. The cloud server 101 (e.g., a geographically distributed set of multiple machines configured to function as a single server) runs a location-based mobile game application 110.

The cloud server 101, the application 110, the database 111, and the devices 151 and 161 each may be implemented by a general purpose or by a special-purpose computer system, in whole or in part.

The player unit 160 could be one of multiple such players/groups playing a location-based game. Each group can consist of one or more players 162, each player equipped with a mobile device 161 and an optional XR headset 163. All mobile devices are connected to the cloud 101 through the network 140.

The monitoring unit 150 is optional. It plays an important role when an on-line supervision and controlling of the entire game are required. Such as real-time changing of the LBM and ARCM locations and their use, controlling the contents and information communicated via LBMs, and monitoring events associated with LBMs. The monitoring unit 150 may be a human 152, a machine (e.g., a computer configured by a software program to interact with the players), or any suitable combination thereof (e.g., a human assisted by a machine, or a machine supervised by a human). The monitoring unit 150 is associated with the computing device 151, which maybe a mobile device, a PC or other computing device.

The player unit 160 may consist of a single player 162 or of a group of players. The player 162 must be equipped with a mobile device 161, such as smartphone, and optionally with an AR headset 163.

A smartphone is a portable device that combines mobile telephone and computing functions into one unit. They are distinguished from feature phones by their stronger hardware capabilities and extensive mobile operating systems, which facilitate wider software, Internet (including web browsing over mobile broadband), and multimedia functionality (including music, video, cameras, AR and gaming). All smartphones use GNSS for location (GNSS refers to a variety of satellite systems used across the globe), enabling accuracy. However, in some cases a smartphone may be replaced or assisted by a tablet computer, a vehicle computer, or a wearable device. For tasks where the supervisor's mobility is not essential, a desktop computer, a home media system, a console, or a navigational device can be used for supervising tasks, in addition to or instead of the above, as it will be described thereafter.

When the player 162 hits an ARCM 137 through his mobile device 161, the ID of the ARCM 137 is transmitted to the cloud 101 via the network 140, updating the cloud map 132, allowing to continuously track the players' 162 steps, by the application 110 and/or the monitoring unit 150.

As used herein, a "database" 111 is a resource to store data structured in any of the format, including a text file, a multimedia file, a gaming file, a table, a spreadsheet, a relational database (e.g., an object-relational database), a triple store, a hierarchical data store, or any suitable combination thereof. In particular, the database 111 incorporates the gameplay template 133, Customization templates 134, Maps and ground plans 135, LBMs 136, ARCMs 137, and parameters (interactive and non-interactive) 138. In addition, the database 111 includes the game status file 132 that holds the status of all the components: the AGC modules, the ARCM marks, the players and their UpToDate location, the scores, etc. It is constantly updated by the progressing gaming events. The Maps and ground plans 135 are for the system's internal use, not for the players.

The component 130 is a resource to store all the Gaming Contents, of the various media (videos or still images, or other multimedia elements such as XR, sound effects, music, narration, and text), required for the game or for the gamified application. Alternatively, part of the contents can be reached on-line from the WEB via the network 140.

The network 140 may consist of any network that enables communication between or among systems, machines, repositories, and devices (e.g., between the cloud server 101 and the devices 151, 161). Accordingly, the network 140 may be a wireless one (e.g., a mobile or cellular network). The network 140 may include one or more portions that constitute a private network, a public network (e.g., the Internet), or any suitable combination thereof. Accordingly, the network 140 may include one or more portions that incorporate a local area network (LAN), a wide area network (WAN), the Internet, a mobile telephone network (e.g., a cellular network), a wired telephone network (e.g., a plain old telephone service (POTS) network), a wireless data network (e.g., a WiFi network or WiMax network), or any suitable combination thereof. Any one or more portions of the network 140 may communicate an information via a transmission medium. As used herein, "transmission medium" refers to any intangible (e.g., transitory) medium that can communicate instructions for execution by a machine and includes digital or analog communication signals or other intangible media to facilitate communication of such software.

Referring to FIG. 2 which illustrates a methodology of creating a game using the templates. A template is a group of pre-designed gaming files having a preset format, used as a starting point for a dynamic game creation so that the game each time it is used, does not have to be redesigned from scratch for every playground, environment, and player. A raw template game has a modular and customizable format such that by module customization, assembly and mapping, the complete location-based game is created, fully tailored according to the location, the player and the environment.

Embodiments of the invention are directed towards designing a modular template for easily creating, modifying, and maintaining mobile location-based games and gamified applications, played remotely from a cloud. Multiple games can be constructed from the same template and can be played at different locations, by different players. The templates are applied on gaming modules one at a time. Flexibility in the game creation is enabled by subdivision of games into modules. They can be independently created, modified, replaced, or exchanged within the game or among different games.

The template files consist of Gameplay Template 205 and Customization Templates 211. The Gameplay Template 205 constitutes the generic gaming core, breakdown to a Game Outline 212 and a Pool of Raw Modules 213. The Game Outline 212 defines the basic skeleton of the game, such as the outline of participating modules, their order, the game plot, and general pre-requisites (e.g., season, weather, min/max age of the player, a group, or a single player, etc.). It is a subscription of how the Raw Modules 213 should be used to construct the game. The Raw Modules 213 are the source of gaming segments that should be adapted by the Customization Templates 211, parameters 219 and the module building application 216, then assembled into complete game by an application 221.

The Customization Template 211 constitutes Environmental Templates 214 and Personalization Templates 215, both designated to assist customizing the raw modules 213. Each template comprises of customization classes, which may change from game to game, or from module to module. In practice, there maybe also different or additional modification classes, according to specific gameplay needs. Further, there might be more modification classes, or more sets of customization data, according to the game developer decision. The Environmental Templates 214 are used to match between the raw module 213, the game's location, and environmental parameters 219 to adapt the game to the current location and environment. Location 201 indicates a specific location (geolocation), as well as the nature of the landscape. For example, a forest-planned game can't be played on a city street. Other classes are season 202 and weather 203, whereas there are games that cannot be played equally in different seasons or weather. Similarly, the class of indoor/outdoor 204 is essential for many games. The Personalization Templates 215 assist adapting to the player's preferences for enhanced gaming experience. The language class 206 refers to the language of the player. In the first place, the original raw module 213 can be generated in some primary language, e.g., English. However, when the player prompts another language, the English module must be replaced with the language of player's choice. The Culture class 210 refers to the culture or player's profession in applicable cases. Beside the language, in some cases the gamer's interpretation or understanding depends on his cultural background or on his profession. For example, a guided tour in the Hagia Sofia Mosque in Istanbul, created according to embodiments of the present invention, may suffer from different effectiveness for Christians, Jews, or Moslems, or for architects or clerics because of their different background and cultural beliefs. The same refers to the Age class 207, wherein a child must meet a different content, or different physical gaming tasks than his parents. The gender class 208 may also be relevant to games of physical tasks, or a gender-biased interest. The expected difficulty level 209, either physical or cognitive, should also be adapted to the player. Some games would be played differently according to player's physical conditions.

The module building application 216 creates a mature LBM module 220, specifically adapted to the player and to the physical gaming environment, based on the Gameplay Template 205, Customization Templates 211, interactive parameters (prompted from the player) (not shown) and game environmental parameters 219. The interactive parameters maybe queried interactively from the user (e.g., language, age, gender) while the non-interactive parameters are supposed to be known by the system (location, weather, etc.). The mature LBM module 220, fully customized to the player and the game environment, joins up to other modules as an input to the game assembling application 221. The module building application 216 assembles and integrates all the modules according to the prescription of the game outline 212, parameters 219, and a game configuration by the game administrator 217 of number of modules, number of players, selection of raw modules, contents revision, etc.

Finally, the game assembling application 221 maps the location-based game onto topography (or onto floor plan for indoor games) 218 of the gaming terrain. Here, the monitor unit 222 can intervene for manual changes. The LBM modules of the game are being interconnected by ARCM marks, creating a complete modular network.

The basic tool for relocating and customizing the game are template files applied on a raw gaming module to match the required gaming features. These features are partly represented by input parameters.

FIG. 3 shows a hierarchical structure of the relocation tools of the present invention, applied by the module building application 216, as shown in FIG. 2. The relocation tools are organized in three hierarchical levels: a basic level of a Generic Core 310, a second level of a Setup Design 311, and a third level of User's Customization 312. The Generic Gaming Core 310 is the starting point of the game creation, imposing its basic skeleton 302, and a rich library of raw modules 301. This core 310 undergoes a relocation and configuration by the Setup Design level 311, for specific location and environment, and further by the User's Customization level 312, for customization to the player. While the Generic Core 310 is predesigned and developed by game developers, the Setup Design 311 of relocation and customization is an easy and fast process: done by the game administrator or one or more players in an interactive time. The User Customization 312 process of personalization is done automatically as part of the game.

The relocation tools of the present invention are based on applying templates onto modules. For example, one of the classes of the Personal Customization Template 307 is the "age" class of the player. As shown in FIG. 2, there may be several instances of the template, for different ages 207. The right instance is chosen according to the "age" parameter prompted from the player. It is aware of all the places in a raw module that must be visited for customization to the actual player's age. The modification of these places is done by the Module Building application 216, implanting age-related contents (e.g., children or adults) in all relevant places in the module.

In many cases the content modification is a necessary condition for global distribution of the game. For example, an educational game dealing with historical places (see example FIGS. 10a and 10b) would probably need diverse national versions. Such a version could be delivered by the template class "culture" 210 or a manual modification 303 would be allowed by the game administrator as part of the Setup Design 311.

The two components of the Generic Core level 310 comprise the core of the game: the Game's Outline 302 holds the skeleton of the game, and the Pool 301 holds many row modules. The generic core 310 is the only common portion for all relocation instances of the game. It undergoes customized transformation for each instance. Such a transformation is done by the upper levels, the Setup Design 311 and the User's Customization 312. It comprises possible revision and local adaptation of the contents, customization to the specific location and environment, and personalized customization to the players.

The level 303 of the Setup Design 311 configures the raw modules according to the requirements of the planned game (modified contents, number of players, number of modules, type of raw modules, modifying module's contents, choosing different media, etc.). The Environmental Customization Template 304 is applied on a raw module coming out of the pool 301. The customization to specific location is done according to the provided map 305, and environmental parameters 306. On top of it, the next level of User's Customization 312 applies the Personalized Customization Template 307 on the module according to the parameters 308. These parameters 308 are interactively prompted from the player at the beginning of the game. For recurring games, played in the same location and by equivalent players, the phases of setup and customization can be skipped after the first time, leaving the game as is to be played again and again.

The relocation mechanism of the present invention inherently combines the advantages of customization, scalability, and flexibility.

Customization—It enables relocation of the game to alternative sites (new maps, ground plans, etc.), enhances the gamer's experience (applying the prompted personal parameters), and expands the target audiences (various places and audiences around the world).

Scalability—The aspects of scalability include an arbitrary number of modules in a game, variable size of the game, the number of topics in a game, and number of players. Arbitrary number of modules may be selected out of the pool of raw modules, depending on location conditions. An example can be taken from a ZOO test case, as shown in FIGS. 11a-13b. The number of LBMs depends on the planned number of stops, which in turn depends on the size and species variety at the ZOO. The selection is therefore size specific and is done at the setup level.

Contents flexibility—The contents of the game modules may vary based on the location or on the player. For example, considering the ZOO locations of FIGS. 11a-13b, In case a white bear replaces a brown one, then contents modification for the site is required. Moreover, contents modification can also depend on the player: e.g., if an animal module contains a children song, then in Melbourne it would be mostly sung in English, in Belgrade in Serbian, and in Jerusalem in Hebrew. Both, such site-based and player-based modifications, can be done at the setup level.

The generation of a complete location-based modular game is described in the flowchart of FIG. 4. The description may also refer to the schemes of FIG. 2 and FIG. 3. Firstly, the game outline is brought into the module building application at step 401. The next two steps, 402 and 403, providing customization parameters, are mostly required only once during the game, may be at the very first LBM or even as a pre-game step. Thus, these steps would be absent in all subsequent LBMs. Step 402, of prompting the participant for his/her personal data, is done by the customization agent of the first LBM. The data of step 403, non-interactive parameters such as environmental parameters of weather, season, or geolocation, should be found in the cloud database 111, stored in advance.

Construction of the LBM starts at step 404 by choosing the correct raw module, based on the game outline 302 and selection of raw modules 303 at the Setup Design level 311. Then the appropriate set of customization template is chosen at step 405, from Environmental Customization Template 304 and the Personalized Customization Template 307, along with the parameters 308. Guided by the game outline, a new LBM is created and customized at step 406 by the module building application, amassed with other LBMs at step 407 to be taken to the game assembling application 221, where they all are moved when ready at step 409 depending upon the condition satisfied at step 408. As stated before, there are three different options of mapping the LBM modules over the gameplay terrain: (a) automatically by the gaming application, (b) by the monitoring station, and (c) manually by one of the players (or group of players). The blocks 413, 414 make choice of the embodiment. When the automatic choice is taken at 410, the LBM modules are automatically mapped over the topographical map of the terrain. This block is bypassed when mapped by the Monitoring Unit at step 415, or by the player at step 416. Thereafter, the LBM modules are interconnected by sequenced ARCM marks at 411, and each ARCM is given individual attributes at 412: location (GPS based), direction, ID, and related players. Then the locations are updated in the database and the process is completed at step 420.

FIG. 5a illustrates a flowchart depicting a possible working of the monitoring unit (MU) 150, according to the needs arise during multiplayer/multigroup games in accordance with an aspect of the present invention. The monitoring unit (MU) 150 allows real-time flexibility. All relevant information (status, maps, etc.) is brought to the MU 150 from the cloud at step 5101. Modifications can be applied either on location or/and contents of LBM at step 5102, and on ARCM interconnections at 5103 and at 5104, separately or on both (LBM, ARCM). The MU modifications are concluded by an update of attributes, status, lists, and maps in database at step 5105.

FIG. 5b shows manual mapping by a player when the user's option is selected. The placing is typically done by a leading (or fleeing) player, placing the LBM for the following/chasing players. The choice of the LBM location is up to the player and the geolocation is automatically communicated to the OS by his mobile device. The interconnecting ARCMs are generated automatically by the game's OS, along the player's path, coordinated with the map of the gaming ground. Firstly, the player marks the LBM location on the gameplay ground at step 5201 and the game's OS syncs the location with the map at 5202. ARCMs are automatically generated following the player's track at 5203. The locations, attributes and status of the newly created ARCMs are updated in the database at 5204, completing the manual LBM location and ARCM interconnection at 5205.

A location-based mobile game is designed as an assembly of location-based modules (LBM), where each module is location-specific by its contents and by its functions. The mature LBM is the result of customization and personalization transformation. The LBMs, scattered throughout the playground, are visible to the player as augmented reality objects, interconnected by augmented reality chalk marks (ARCM), forming the overall gameplay structure. As shown in FIG. 6 which illustrates a structure of the location-based module, the LBM plays a triple role: as a gaming segment 62 (communicating the gaming contents and interacting with the player), as a customization agent 63 (collecting user's parameters), and as an administration agent 61 (communicating, synchronizing, interfacing, and coordinating between the player, the cloud and optionally the monitoring unit.).

The LBM gaming segment 62 is a modular part of the gameplay, forming the complete game along with other LBM modules, topographically distributed over the playground. As listed in 62, it can deliver all kind of required contents (gameplay, gaming instructions, quiz, educative experiments, competing assignments, narratives, travel guides, etc.) and different media technologies (video, audiovisual, XR, video gaming, etc.), by communicating between the cloud and the player's mobile devices.

As an administration agent 61, the LBM reports to the cloud on the game and players status, accommodates emergency calls and messages within the gaming environment, and enables a control of the monitoring unit during the game. Modifications to the LBM contents and location may be done by the MU, as well as modifications to the path of ARCMs.

As a customization agent 63, the LBM executes an interface between the cloud and the player, querying the player for his personal parameters (such as language, culture, age, gender, expected difficulty, etc.). These parameters are used to personalize the game for the player. This role of customization agent 63 is exercised only once during the entire game, at the beginning (e.g., the first module), or even as a pre-game step.

The ARCM marks, chained on the playground as augmented reality objects, guiding the player toward the next LBM module, are visible through player's mobile device or AR headset. They can have any arbitrary shape, not just of an arrow. They also may be replaced (partly or fully) by an LBM given instruction, directing a leap to the next location. For example, a message given by the LBM's administration agent: "the next stop is under the Oak tree, 500 m northwards". There are 4 parameters attributed to each ARCM, as shown in FIG. 7a. The first two parameters 7101 and 7102 define the location (based on GPS) and the direction of the marker, respectively. The third parameter 7103 is the marker's sequential number ID. When a chain of ARCM markers is laid, each marker is assigned a sequential ID number to allow tracking the player's location, when a hit with an ARCM occurs. The fourth parameter 7104 is a list of authorized players associated with the ARCM mark, for filtering out unauthorized players.

A hit of an ARCM mark by the player allows the player's remote identification and the status of tracking. Upon hit, the mark's ID 7103 is automatically reported to the cloud, updating the maps and lists. The flowchart in FIG. 7b shows a method of how an ARCM is handled when hit by the player. Once a hit occurs at step 7201, the player is recognized at 7202, tested for authorization at 7204, and the information is sent to update the games operating system at 7203.

As shown in FIG. 8, upon hitting the LBM by the player, the administration agent takes care for the interaction between the player (by its mobile device) and the game's OS (in cloud), shown in the first part of the flowchart in FIG. 7b. The LBM-player encounter and the emergency call are handled by the LBM administration agent. The LBM hit by the player is recognized by gauging the proximity between the player's GPS location (continuously sent to the cloud) and the LBM location on the map at step 801. The player is identified and checked for authorization at 802. If authorized, the maps, lists and game status are updated at 803. As part of the encounter, the need for emergency call is tested at 804, and if confirmed, a call to MU can be accommodated or an emergency message sent to the cloud at 805. The game can be stopped at this point, if necessary at 806, or continue again to step 801.

From here on the gaming segment of LBM takes over. If needed, an introduction, task description or gaming instructions are given first through the players mobile device (using voice, video, text, or otherwise) at step 807. Then, the game itself starts (such as a task to perform, quiz to be asked, experiment, assignment, competition, etc.), applying any of the media: voice, audiovisual, XR, video gaming, physical task, etc. at 808.

Three examples of gamified applications, based on embodiments of the present invention, are given. The first example is an educational musical game illustrated in FIGS. 9a-9d, the second is a touristic tour in Colosseum illustrated in FIGS. 10a and 10b, and the third is an educational zoological application illustrated in FIGS. 11a-13b.

Location-based educational gamified applications, are games with educational objectives, explicitly designed to be played in a specific location. All types of games may be used, however the location where they are played must have an added value, helping learn about certain subjects, expand concepts, reinforce development, understand a historical event, nature environment, science, or culture, providing structure, motivation, and involvement in the game itself.

The first example demonstrates a musical educational gamified application intended to teach two programmatic musical compositions in a gamified way, played outdoor. The first exemplary musical piece is The Sorcerer's Apprentice by Paul Dukas, relating to the name of the chosen location. The second exemplary musical piece is Peter and the Wolf by Sergei Prokofiev, relating to the location of lakeside grove, where the story plot takes place. The playground landscape is shown in FIG. 9a, while in FIG. 9b the same landscape is viewed through a handheld computing device (smartphone, tablet, etc.) or an AR headset. AR images of ARCMs 922 are shown, leading to an LBM mark 921, AR as well.

The game comprises two competing groups of players, intended to learn the two musical compositions at the first two stops 9401, 9405 and 9403, 9407 (respectively), and then meet at the third stop 9404 for the music mastering contest. The players are guided by ARCMs 9402 and 9406 throughout the gameplay grounds of the Sorcerer Mountain by the lake, as shown in the map 9410. The first stop of each of the groups, LBM-A.1 and LBM-B.1, encounters the children with the first musical composition The Sorcerer's Apprentice (well-known from the Disney's film version Fantasia). The story plot is about an old sorcerer and his young apprentice. Each of the episodes of the story is characterized by a programmatic piece of music.

The second stop, LBM-A.2 and LBM-B.2 confronts the groups with the Peter and the Wolf music, while the orchestra illustrates each character in the story by using different instruments. The intent is to introduce children to the individual instruments of the orchestra, and the children learn to distinguish the sounds of the instruments during the performance of this music. In both LBMs, the musical contents come with animated features, and both, the music and the moving pictures are communicated to the players by the location-based gaming segment of LBM. The final competition of matching the music vs. episode pictures takes place at the last LBM 9404.

This educational game could be played elsewhere as well, having a different number of LBMs, different track, different language, modified contents, etc. The way it is played as described above is the result of adaptation to the Mount Sorcerer location and customization to the specific group of children by the customization and relocation tools of the present invention, as described in FIG. 9c. These tools transform a generic gaming core into location and player's specific game. The Generic Core level 9310 comprises the generic state of the gamified application: the Outline 9302 holds the skeleton, and the Pool 9301 holds many module prototypes (row modules). Both are predesigned and predeveloped by game developers, while their transformation into fully customized game is done in an interactive time. The transformation is based on templates applied on selected modules. Firstly, comes the adaptation of the gameplay, the location and environment by the Setup Design level 9311, then comes the customization to the players by the User's Customization level 9312. The Setup Design 9311 shapes up the raw modules according to the requirements of the planned game 9303 (number of players, number of modules, what raw modules, modifying module's contents, choosing different media, etc.), customizes the modules to specific location (by the map 9305), and applies the Environmental Template 9304 (location, indoor/outdoor, season, weather, etc., along with the environment parameters 9306) on the modules. On top of it the User's Customization level 9312 applies Personal Template 9307 (age, language, difficulty, etc.), along with parameters 9308. Consequently, the original generic core of the gamified application is set to 5 modules played by 2 groups of children 9303, relocated to the Sorcerer Mountain 9305, played outdoor in a sunny summer 9306. The users are 11 old kids, speaking English, and playing at mid-level difficulty 9308.

The location-based touristic tour is a gamified application. It is played out of the cloud at the location of interest, strengthen by multimedia elements such as videos or still images, XR, sound effects, music, narration, and text. It is distinguished from the prior art virtual tour which does have to take place in the real location but can be based on a variety of videos, photographic-based media, or simulation of the location of interest.

Customization of the second example, a gamified location-based touristic application, is shown in FIGS. 10a and 10b. This is a non-monitored application, intended for a single user, carried-out at the site of interest, the Roman Colosseum. The application can utilize a sequence of videos or still images, or other multimedia elements such as XR, sound effects, music, narration, and text. The typical prior art virtual tours don't take place in a specific location, but instead they are based on a variety of videos, photographic-based media, or simulation of the location of interest.

The Colosseum ground plan 1025 is essential for restricting the game to this particular place in Rome, Italy. Three LBM modules have been selected to compose the tour along the trail: first at the front of the Colosseum 1020, second at an interior overlook 1021, and third at gladiator's arena 1022. The exemplified tour is only one of many possible scenarios within the Colosseum and can be scaled to any number of modules out of the game's template, along any arbitrary track.

FIG. 10a shows how a generic gaming core is being transformed into location specific game by implementing the relocating tools of the present invention. The Generic Core level 10110 comprises the core of the game in a generic way: the Outline 10102 holds the skeleton of the application, and the Pool 10101 holds many module prototypes (row modules). Both are predesigned and developed by game developers. By applying the relocation tools of the present invention, this generic core is converted into fully customized game in an interactive time. The relocation tools are based on templates applied to modules. The Setup Design 10111 shapes up the raw modules according to the requirements of the planned game 10103 (number of players, number of modules, what raw modules, modifying module's contents, choosing different media, contents revision, etc.) and applies Environmental Template 10104 (according to parameters 10106) on the modules, and customizes the modules to specific location (by map 10105). On top of it, the User's Customization level 10112 applies Personal Template 10107 (according to parameters 10108). Consequently, the original generic core of the gamified application is being relocated to the Colosseum ground 1025, set to 3 modules played by a single player 10103, played outdoor in a sunny summer, 2 pm 10106. The user is a 35 year old lady, speaking Italian language 10108. BTW, the time 2 pm is needed to place the second stop 1021 in a shadowed place for enhanced experience in such a sunny day.

The gaming segment of the first LBM 1020 may combine text and visuals modes, both displayed on the mobile's screen of the user. The text mode can serve as an introduction, while the visual mode can assist in comparing the contemporary ruins vs. the original building. Transition to the second module could be done by a series of AR visible ARCMs (as shown), or alternatively by a single distant ARCM AR-glowing at the next LBM, or a dynamic AR image leading the way to the LBM, or another way saving the detailed tracking of ARDMs. The second module 1021 can be laid on one of the tribunes, overlooking the Colosseum's interior, delivering an audiovisual spectacle. The content is customized to the player's language, gender, age, etc. E.g. an adult content like Rome, Italy: The Colosseum (https://www.youtube.com/watch?v=xaSbYleqGWg) can be easily replaced by All About the Colosseum for Children (https://www.youtube.com/watch?v=e-x74MFiWkg). These contents can be used, wholly or partly, at each of the modules. The audiovisual can be seen as a video displayed on player's mobile screen or an XR headset. A family of tourists can take the tour simultaneously when the LBM are personalized to each family member. The last module 1022 gaming segment can consist of an XR show on the arena ground, where the historical battles used to take place (among gladiators, wild animals, etc.). E.g., the player can watch or play a virtual game of a fighting gladiator against another gladiator or a wild beast, while the emperor and other waiving and cheering people are seen on the background balcony.

The third example is a gamified location-based educational zoological application for kids, encountering and learning animals at a ZOO. The application is focused on a guided tour in the ZOO, however it can also use videos or still images, or other multimedia elements such as XR, sound effects, music, narration, and text. This example demonstrates how, by implementing embodiments of the present invention, the same Generic Core can be easily transformed into 3 different ZOOs each having different collections of animals, different map, located in 3 different countries, and speaking different languages. Three use-cases are shown, at three different locations: Belgrade, Jerusalem and Melbourne.

FIG. 11b shows the Belgrade Zoo map, Serbia. The educational track, marked by ARCM 1124, covers three learning stops: giraffe 1121, elephant 1122, and bear 1123. To adapt the generic core to this specific location and to the visitors, relocating tools of the present invention are implemented, FIG. 11a. The first level, the Generic Core 11110, includes the Outline 11102 that holds a basic skeleton of the application, and the Pool of Raw Modules 11101 holding generic modules for many animal species. The next level, the Setup Design 11111, customizes the generic core into the Belgrade-Zoo-based gamified application, and configures the core according to the requirements of the intentional tour 11103 (number of visitors, number of modules, what raw modules, modifying module's contents, choosing different media, etc.). The relocation and configuration tools are based on templates, parameters and modules. The Environmental Template 11104 and the Environmental Parameters 11106 are applied on the modules, using the location map 11105 of the ZOO 1125. The next level of User's Customization 11112 applies Personal Template 11107 and Personal Parameters 11108. Consequently, the original generic core of the gamified application is relocated to the Belgrade ZOO 1125, for 5 participants that take 3 educational LBM modules 11103, played outdoor, in the autumn season 11106. The participants are 9-year-old kids, speaking the Serbian language 11108.

FIG. 12b shows another Zoo map, that of Jerusalem 1230, Israel. The educational track, marked by ARCM 1229, covers 8 learning stops: giraffe 1221, antelopes 1222, elephant male 1223, elephant female 1224, ostriches 1225, gorilla 1226, lion 1227, and bear 1228. To adapt the generic core to this specific location and personalize for the visitors, relocating tools of the present invention are implemented, FIG. 12a. The first level, the Generic Core 12110, includes the Outline 12102 that holds a basic skeleton of the application, and the Pool of Raw Modules 12101 holding generic modules for many animal species. The next level, the Setup Design 12111, customizes the generic core into the Jerusalem-Zoo-based gamified application, and configures the core according to the requirements of the intentional tour 12103 (number of visitors, number of modules, what raw modules, modifying module's contents, choosing different media, etc.). The relocation and configuration tools are based on templates, parameters, and modules. The Environmental Template 12104 and the Environmental Parameters 12106 are applied on the modules, using the location map 12105 of the ZOO 1230. The next level of User's Customization 12112 applies Personal Template 12107 and Personal Parameters 12108 on the formatting modules. Consequently, the original generic core of the gamified application is relocated to the Jerusalem ZOO 1225, for 10 participants that take 8 educational LBM modules 12103, played outdoor, in the spring season 12106. The group of participants are 15-year-old kids, speaking the Hebrew language 12108.

FIG. 13b shows another Zoo map, that of Melbourne, Australia 1330. The educational track, marked by ARCMs 1326, covers 5 learning stops: giraffe 1321, elephant 1322, tiger 1323, bear 1324, and lion 1325. To adapt the generic core to this location and personalize for the visitors, the relocating tools of the present invention are implemented, as shown in FIG. 13a. The first level, the Generic Core 13110, includes the Outline 13102 that holds a basic skeleton of the application, and the Pool of Raw Modules 13101 holding generic modules for many animal species. The next level, the Setup Design 13111, customizes the generic core into the Melbourne-Zoo-based gamified application, and configures the core according to the requirements of the intentional tour 13103 (number of visitors, number of modules, what raw modules, modifying module's contents, choosing different media, etc.). The relocation and configuration tools are based on templates, parameters, and modules. The Environmental Template 13104 and the Environmental Parameters 13106 are applied on the modules, using the location map 13105 of the ZOO 1330. The next level of User's Customization 13112 applies Personal Template 13107 and Personal Parameters 13108 on the formatting modules. Consequently, the original generic core of the gamified application is relocated to the Melbourne ZOO 13105, for 15 participants that take 5 educational LBM modules 13103, played outdoor, in the winter season 13106. The group of participants are 8-year-old kids, speaking the English 13108.

As shown, all the three zoological gamified applications are initiated by the same Generic Core, but each one has been relocated to a different location in a different continent and a different language. The relocation is based on applying templates on raw modules of the Generic Core. The Setup Design is done in an interactive pace by a game operator or field engineer, based on a preplanned tour and on prepared environmental parameters. The User Customization is done automatically as part of the game by prompting the user for personal parameters. Consequently, the relocation and customization of the application to any ZOO worldwide is an easy and fast process.

FIG. 14 illustrates an exemplary system 1400 for implementing various aspects of the invention. The system 1400 includes a data processor 1402, a system memory 1404, and a system bus 1416. The system bus 1416 couples the system components including, but not limited to, the system memory 1404 to the data processor 1402. The data processor 1402 can be any of various available processors. The data processor 1402 refers to any integrated circuit or other electronic device (or collection of devices) capable of performing an operation on at least one instruction, including, without limitation, Reduced Instruction Set Core (RISC) processors, CISC microprocessors, Microcontroller Units (MCUs), CISC-based Central Processing Units (CPUs), and Digital Signal Processors (DSPs). Furthermore, various functional aspects of the data processor 1402 may be implemented solely as software or firmware associated with the processor. Dual microprocessors and other multiprocessor architectures also can be employed as the data processor 1402.

The system bus 1416 can be any of several types of bus structure(s) including the memory bus or memory controller, a peripheral bus or external bus, and/or a local bus using any variety of available bus architectures known to those of ordinary skill in the art.

The system memory 1404 may include computer-readable storage media comprising volatile memory and nonvolatile memory. The non-volatile memory stores the basic input/output system (BIOS), containing the basic routines to transfer information between elements within the system 1400. The nonvolatile memory can include, but not limited to, read only memory (ROM), programmable ROM (PROM), electrically programmable ROM (EPROM), electrically erasable programmable ROM (EEPROM), or flash memory. The volatile memory includes random access memory (RAM), which acts as external cache memory. RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The system memory 1404 includes an operating system 1406 which performs the functionality of managing the system 1400 resources, establishing user interfaces, and executing and providing services for applications software. The system applications 1408, modules 1410 and data 1412 provide various functionalities to the system 1400.

The system 1400 also includes a disk storage 1414. Disk storage 1414 includes, but is not limited to, devices like a magnetic disk drive, floppy disk drive, tape drive, Jaz drive, Zip drive, LS-100 drive, flash memory card, or memory stick. In addition, disk storage 1414 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM).

A user enters commands or information into the system 1400 through input device(s) 1424. Input devices 1424 include, but are not limited to, a pointing device (such as a mouse, trackball, stylus, or the like), a keyboard, a microphone, a joystick, a satellite dish, a scanner, a TV tuner card, a digital camera, a digital video camera, a web camera, and/or the like. The input devices 1424 connect to the data processor 1402 through the system bus 1416 via interface port(s) 1422. Interface port(s) 1422 include, for example, a serial port, a parallel port, a game port, and a universal serial bus (USB).

The output devices 1420 like monitors, speakers, and printers are used to provide output of the data processor 1402 to the user. Another example, a USB port may be used as an input device 1424 to provide input to the system 1400 and to output information from system 1400 to the output device 1420. The output devices 1420 connect to the data processor 1402 through the system bus 1416 via output adaptors 1418. The output adapters 1432 may include, for example, video and sound cards that provide a means of connection between the output device 1420 and the system bus 1416.

The system 1400 can communicate with remote communication devices 1428 for exchanging information. The remote communication device 1428 can be a personal computer, a server, a router, a network PC, a workstation, a microprocessor-based appliance, a mobile phone, a peer device or other common network node and the like.

Network interface 1426 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

What is claimed is:

1. A modular system for creating, relocating, and customizing a location-based gamified application configured to be played by one or more player units on a playground, the system comprising:
   an application configured to track and supervise the creation of the location-based gamified application;
   a gaming content module configured to store a plurality of contents of different media selected from one or more of video, audiovisual, VR, AR, XR, video gaming required for creation and play of the gamified application; and
   a database storing a plurality of building, customization and relocation tools, wherein the tools are organized in a structure of hierarchical templates, the tools comprising:
   a Generic Gaming Core template for creating a basic skeleton of the gamified application;
   a Setup Design template for incorporating a relocation component into the Generic Gaming Core corresponding to a specific location and environment; and
   a User Customization template for enhancing the gamified application experience.

2. The system of claim 1, wherein the location-based gamified application can be created as a relocatable location-based gamified application, which can be customized automatically or manually for a plurality of geographic sites and players.

3. The system of claim 1, wherein the location-based mobile game application, the gaming content module and the database can be configured on a cloud server and connected to the player units through a network.

4. The system of claim 1, wherein the location-based mobile game application, the gaming content module and the database can be configured on a centralized system or multiple distributed systems interconnected through the network.

5. The system of claim 1, wherein the Generic Gaming Core template comprises one or more of a gamified application outline and a pool of raw modules.

6. The system of claim 1, wherein the Setup Design template relocates the Generic Gaming Core into a specific geographic location and environment, by one or more of configuration parameters of the raw modules and the players, environmental customization templates, maps, ground plans, and environmental parameters.

7. The system of claim 1, wherein the User Customization template customizes the location-based mobile game application by one or more personalized customization templates and interactive parameters.

8. The system of claim 5, wherein the Setup Design transforms the raw modules of the Generic Gaming Core into a set of location-based modules (LBMs), scattered throughout the geographic playgrounds, serving as segments of the gamified application.

9. The system of claim 8, wherein the location-based modules (LBMs) is configured to play a triple role, comprising:
   a gaming segment, wherein the gaming segment is configured for communicating gamified application contents and interacting with the players;
   a customization agent, wherein the customization agent is configured for collecting one or more player's parameters; and
   an administration agent, wherein the administration agent is configured for communicating, synchronizing, interfacing, and coordinating between the players, the network and a monitoring unit.

10. The system of claim 8, wherein the location-based modules (LBMs) are mapped over the gameplay terrain by one of:
   automatically by the gaming application;
   by the monitoring station;
   or manually by one of the players.

11. The system of claim 8, wherein the location-based modules (LBMs) are not predetermined, but generated by the relocation hierarchical tools of the application in an interactive time, then mapped, and interconnected by augmented reality chalk marks (ARCMs) on the playground, forming an overall gameplay structure.

12. The system of claim 1, wherein the gamified application is created on a cloud server, specifically for the geographical location of interest.

13. The system of claim 9, wherein the monitoring unit is configured for supervising the gamified application while being played by the players in the geographical location of interest and connected to the gamified application hosted on the cloud server through the network.

14. A modular system for creating a location-based gamified application, the system comprising:
   one or more player units, each equipped with a mobile device, configured to execute and play the gamified application;
   an application configured to track and supervise the creation of the location-based gamified application;
   a gaming content module configured to store a plurality of contents of different media, such as videos, still images, XR, sound effects, music, narration, and text, required for the creation of the gamified application; and
   a database storing a plurality of customization and relocation tools, wherein the tools are organized in a plurality of hierarchical templates;
   characterized in that:
the location-based gamified application can be created as a relocatable location-based gamified application, which can be customized automatically or manually for a plurality of playing geographical sites and players;
the location-based mobile game application, the gaming content module, and the database may be configured on a cloud server and connected to the player units through a network; and
the plurality of customization and relocation tools comprises:
   a Generic Gaming Core template for creating a basic skeleton of the gamified application;
   a Setup Design template for incorporating a relocation component into the Generic Gaming Core corresponding to a specific location and environment; and
   a User Customization template for enhancing the gamified application experience.

15. The system of claim 14, wherein the Generic Gaming Core template comprises one or more of a gamified application outline and a pool of raw modules.

16. The system of claim 14, wherein the Setup Design template comprises one or more of configuration parameters of the raw modules and the players, environmental customization templates, maps, ground plans and environmental parameters.

17. The system of claim 14, wherein the User Customization template comprises one or more of personalized customization templates and interactive parameters.

18. The system of claim 14, wherein the Setup Design transforms the raw modules of the Generic Gaming Core into a set of location-based modules (LBMs) which serves as the segments of the gamified application.

19. The system of claim 18, wherein the location-based modules (LBMs) are configured to perform one or more of the roles, comprising:
   a gaming segment, wherein the gaming segment is configured for communicating gamified application contents and interacting with the players;
   a customization agent, wherein the customization agent is configured for collecting one or more player's parameters; and
   an administration agent, wherein the administration agent is configured for communicating, synchronizing, interfacing, and coordinating between the players, the network and a monitoring unit.

20. The system of claim 18, wherein the location-based modules (LBMs) are mapped over the gameplay terrain by one of:
   automatically by the gaming application;
   by the monitoring station; or
   manually by one of the players.

21. The system of claim 18, wherein the location-based modules (LBMs) are not predetermined, but generated by the relocation hierarchical tools of the application in an interactive time, then mapped, and interconnected by augmented reality chalk marks (ARCMs) on the playground, forming an overall gameplay structure.

22. The system of claim 19, wherein the monitoring unit is configured for supervising the gamified application while being played by the players and connected to the gamified application hosted on the cloud server through the network.

23. A computer-implemented method for creating a location-based gamified application configured to be played by one or more player units on a playground, the method comprising:
   providing a Generic Gaming Core template for creating a basic skeleton of the gamified application;
   providing a Setup Design template for incorporating a relocation component into the Generic Gaming Core corresponding to a specific location and environment; and
   providing a User Customization template for enhancing the gamified application experience;
   characterized in that:
the location-based gamified application may can be created as a relocatable location-based gamified application which can be customized automatically or manually for a plurality of playing sites and players.

24. The method of claim 23 comprising storing the hierarchical structure of Generic Gaming Core template, the Setup Design template and the User Customization template in a cloud database.

25. The method of claim 24 further comprising storing a location-based mobile game application and a gaming content module in the cloud database.

26. The method of claim 23, wherein providing the Generic Gaming Core template comprises providing one or more of a gamified application outline and a pool of raw modules for creating the basic skeleton of the gamified application.

27. The method of claim 23, wherein providing the Setup Design template comprises providing one or more of configuration parameters of the raw modules and the players, environmental customization templates, maps, ground plans and environmental parameters for incorporating a relocation component into the Generic Gaming Core corresponding to a specific location and environment.

28. The method of claim 23, wherein providing the User Customization template comprises providing one or more of personalized customization templates and interactive human parameters for enhancing the gamified application experience.

29. The method of claim 27 further comprising comprises transforming the raw modules of the Generic Gaming Core into a set of location-based modules (LBMs) which serves as the segments of the gamified application.

30. The method of claim 29, wherein the location-based modules (LBMs) are configured to perform one or more of the roles, comprising:

a gaming segment, wherein the gaming segment is configured for communicating gamified application contents and interacting with the players;

a customization agent, wherein the customization agent is configured for collecting one or more player's parameters; and an administration agent, wherein the administration agent is configured for communicating, synchronizing, interfacing, and coordinating between the players, the network and a monitoring unit.

31. The method of claim 27 further comprising mapping the location-based modules (LBMs) over the gameplay terrain by one of:

automatically by the gaming application;

by the monitoring station; or manually by one of the players.

32. The method of claim 27 further comprising generating the location-based modules (LBMs) in an interactive time by the relocation hierarchical tools of the application, then mapping, and interconnecting them through augmented reality chalk marks (ARCMs) on the playground, forming an overall gameplay structure.

33. The method of claim 27 wherein directions to the next LBM may be included in the current LBM and communicated to the player, making the chalk marks redundant.

34. The method of claim 23 comprising creating the gamified application on a cloud server.

35. The method of claim 30 further comprising supervising the gamified application through the monitoring unit while being played by the players.

* * * * *